(12) United States Patent
Kamath et al.

(10) Patent No.: US 9,294,267 B2
(45) Date of Patent: Mar. 22, 2016

(54) METHOD, SYSTEM AND PROGRAM PRODUCT FOR SECURE STORAGE OF CONTENT

(71) Applicants: Deepak Kamath, Eden Prairie, MN (US); Sanjay Shridhar, Santa Clara, CA (US)

(72) Inventors: Deepak Kamath, Eden Prairie, MN (US); Sanjay Shridhar, Santa Clara, CA (US)

( * ) Notice: Subject to any disclaimer, the term of this patent is extended or adjusted under 35 U.S.C. 154(b) by 0 days.

(21) Appl. No.: 13/679,928

(22) Filed: Nov. 16, 2012

(65) Prior Publication Data

US 2014/0140508 A1 May 22, 2014

(51) Int. Cl.
*H04L 9/08* (2006.01)
*H04L 9/32* (2006.01)

(52) U.S. Cl.
CPC ............ *H04L 9/0822* (2013.01); *H04L 9/0863* (2013.01); *H04L 9/0869* (2013.01); *H04L 9/3226* (2013.01); *H04L 9/3242* (2013.01); *H04L 9/3271* (2013.01)

(58) Field of Classification Search
CPC . H04L 63/0435; H04L 9/0816; H04L 9/0819; H04L 9/0822; H04L 9/0861; H04L 9/0863; H04L 29/06659; H04L 29/06666
See application file for complete search history.

(56) References Cited

U.S. PATENT DOCUMENTS

| | | | |
|---|---|---|---|
| 5,787,169 A * | 7/1998 | Eldridge et al. ............ | 713/165 |
| 6,044,155 A * | 3/2000 | Thomlinson et al. ........ | 713/155 |
| 6,360,322 B1 * | 3/2002 | Grawrock ................... | 713/176 |
| 6,401,206 B1 * | 6/2002 | Khan et al. ................. | 713/176 |
| 6,662,299 B1 * | 12/2003 | Price, III .................... | 713/171 |
| 6,760,752 B1 * | 7/2004 | Liu et al. .................... | 709/206 |
| 6,947,556 B1 * | 9/2005 | Matyas et al. ............... | 380/29 |
| 7,461,268 B2 | 12/2008 | Drehmel | |
| 7,657,756 B2 | 2/2010 | Hall | |
| 7,802,096 B1 | 9/2010 | Matthews | |
| 7,814,317 B1 * | 10/2010 | Matthews et al. ........... | 713/165 |
| 7,904,732 B2 | 3/2011 | Cui | |
| 8,140,847 B1 * | 3/2012 | Wu ............................. | 713/175 |
| 2001/0056541 A1 * | 12/2001 | Matsuzaki et al. .......... | 713/193 |
| 2002/0099947 A1 * | 7/2002 | Evans ......................... | 713/193 |
| 2004/0103288 A1 * | 5/2004 | Ziv et al. .................... | 713/185 |
| 2004/0236958 A1 * | 11/2004 | Teicher et al. .............. | 713/193 |
| 2005/0033963 A1 * | 2/2005 | Ronchi et al. .............. | 713/170 |
| 2005/0097325 A1 * | 5/2005 | Morris et al. ............... | 713/170 |
| 2005/0125698 A1 * | 6/2005 | Yeates et al. ............... | 713/202 |
| 2005/0166263 A1 | 7/2005 | Nanopoulos | |
| 2005/0223216 A1 * | 10/2005 | Chan et al. ................. | 713/153 |
| 2005/0259458 A1 | 11/2005 | Rustagi | |
| 2007/0061889 A1 | 3/2007 | Sainaney | |
| 2007/0079143 A1 * | 4/2007 | Fazal et al. ................. | 713/193 |
| 2007/0124321 A1 * | 5/2007 | Szydlo ........................ | 707/102 |

(Continued)

*Primary Examiner* — Darren B Schwartz
(74) *Attorney, Agent, or Firm* — Ariel S. Bentolila; Bay Area IP Group LLC

(57) ABSTRACT

A method, system and program product comprise obtaining a user's username and password. A random key is generated for use as a master key. The master key is encrypted using the password to create an encrypted master key. A hash function is performed on the password to create a password hash. A random key is generated for use as a content key for encrypting the user's selected content. The content key is encrypted using the master key to create an encrypted content key. The selected content is encrypted using the content key to create encrypted content. The username, password hash, encrypted master key, first encrypted content key, and encrypted content is communicated to a server for storage in the user's account in which the possibility of decrypting at least the encrypted content by operations on the server is mitigated.

23 Claims, 24 Drawing Sheets

(56) References Cited

U.S. PATENT DOCUMENTS

| | | |
|---|---|---|
| 2007/0208743 A1 | 9/2007 | Sainaney |
| 2008/0031447 A1 | 2/2008 | Geshwind |
| 2008/0059810 A1* | 3/2008 | Ishimoto ....................... 713/193 |
| 2008/0123850 A1 | 5/2008 | Bhatnagar |
| 2008/0155276 A1* | 6/2008 | Chen et al. ................... 713/193 |
| 2010/0100721 A1* | 4/2010 | Su et al. ........................ 713/150 |
| 2011/0314304 A1 | 12/2011 | Braams |
| 2012/0005485 A1 | 1/2012 | Kambayashi |
| 2012/0096268 A1* | 4/2012 | Dogu et al. ................... 713/170 |
| 2013/0007464 A1* | 1/2013 | Madden ........................ 713/179 |
| 2013/0198521 A1* | 8/2013 | Wu ................................ 713/175 |

\* cited by examiner

METHOD, SYSTEM AND PROGRAM PRODUCT FOR SECURE STORAGE OF CONTENT

CROSS-REFERENCE TO RELATED APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to communication systems. More particularly, one or more embodiments of the invention relate to secure communication systems.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

With the advent of global networking and information exchange, secure exchange of information is needed to prevent unauthorized access. The secure exchange of information is needed for a many applications including health care information, financial information transactions, business information transactions, military information exchanges and government information exchanges.

Conventional methods for information exchange make use of a server for depositing information which may be later accessed and retrieved by users authorized to access the information.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
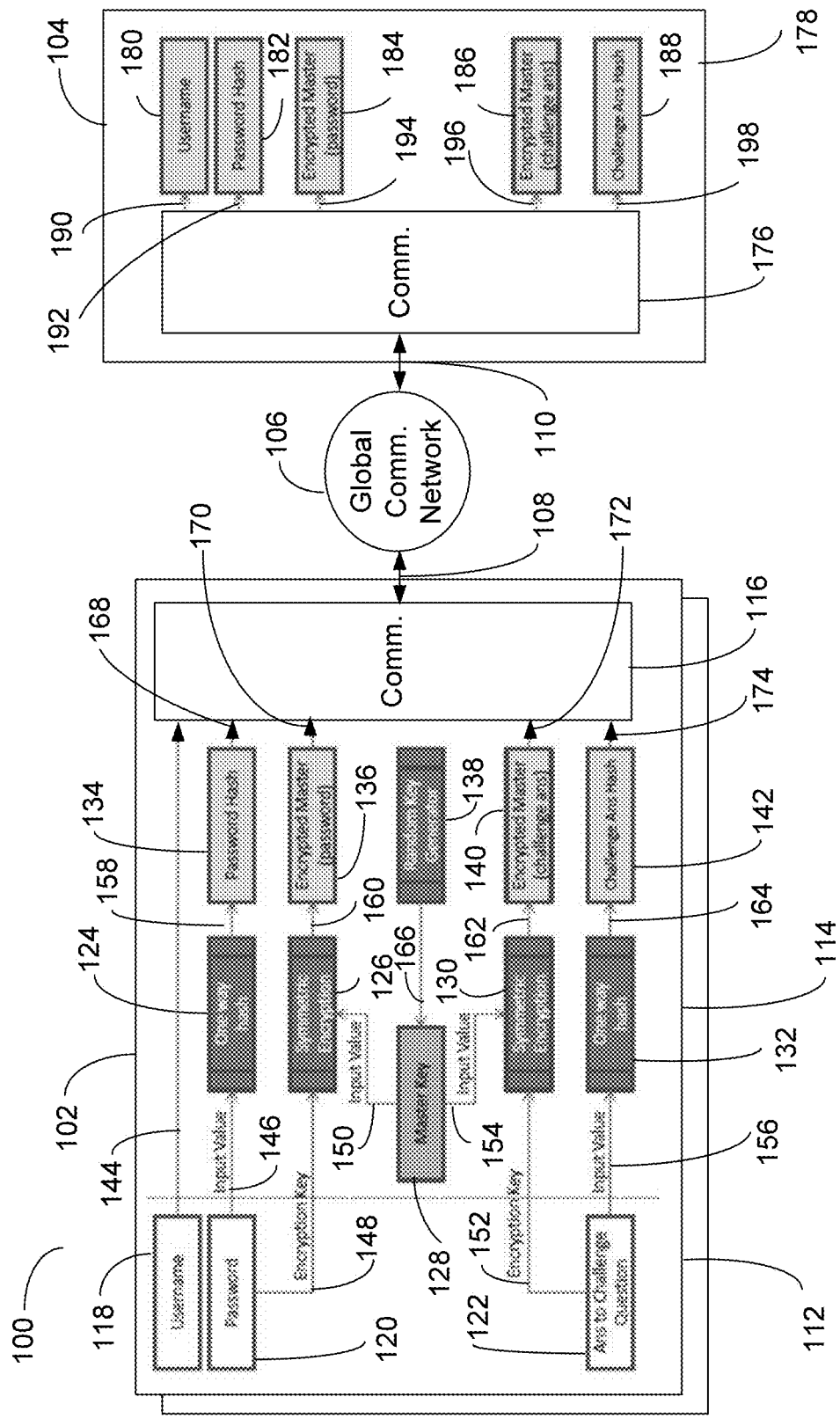
FIG. 1 is a block diagram of an example secure communication system, in accordance with an embodiment of the present invention.

Unless otherwise indicated illustrations in the figures are not necessarily drawn to scale.

DETAILED DESCRIPTION OF SOME EMBODIMENTS

Embodiments of the present invention are best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present application or of any further application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" may refer to prescribed rules to operate a computer. Examples of software may include: code segments in one or more computer-readable languages; graphical and or/textual instructions; applets; pre-compiled code; interpreted code; compiled code; and computer programs.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash memory; a memory chip; and/or other types of media that can store machine-readable instructions thereon.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

A non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; however, the non-transitory computer readable medium does not include a pure transitory signal per se.

A secure communication system will be described which provides means and method for allowing users to securely store and exchange electronic information on a server such that persons associated with providing/maintaining server or otherwise not privileged with access to information stored on the server may not access unencrypted content stored on server. Security is established via a master key used for encrypting content. As a non-limiting example, the master key is a randomly generated encryption key. It is encrypted using a user's password and a user's answer to a challenge question. Information is encrypted prior to being transferred to a server using the Master Key in a direct or indirect way. In some alternative embodiments, random key is pseudo-randomly generated.

The master key used to encrypt content is not transported or stored on the content server in an unencrypted form. The master key may be encrypted via a browser executing on a computing device and using a user's password for encryption processing. A one-way hash of the user's password is stored on the content server. Content is encrypted when stored on server and server provider is not provided access to unencrypted content or unencrypted keys.

A user may securely retrieve content, securely share content with another user and/or securely receive content from another user.

An authorized user may elect to change or reset a password. Reset of a password include authentication using a challenge question/answer.

The secure communication system will now be described in detail with reference to FIGS. 1-20.

FIG. 1 is a block diagram of an example secure communication system, in accordance with an embodiment of the present invention.

A secure communication system 100 may operate to perform new user activation.

Secure communication system 100 includes a multiplicity of computing devices with a sampling noted as a computing device 102, a server device 104 and a global communication network 106.

Secure communication system 100 communicates information in a secure manner between the various associated devices. For the embodiment of FIG. 1, secure communication system 100 performs user activation.

Global communication network 106 communicates bi-directionally with computing device 102 via a communication channel 108 and with server device 104 via a communication channel 110.

Computing device 102 receives, stores, retrieves, transmits, processes and presents information for viewing. Server device 104 receives, stores, retrieves, transmits and processes information. Global communication network 106 receives, transmits and processes information.

Computing device 102 includes a user interface portion 112, an application portion 114 and a communication portion 116.

User interface portion 112 receives and presents information to a user (not shown). Application portion 114 performs processing associated with applications. Communication portion 116 receives, transmits and processes information.

User interface portion 112 includes a username portion 118, a password portion 120 and a challenge portion 122.

Application portion 114 includes a hash portion 124, a symmetric encryption portion 126, a master key portion 128, a symmetric encryption portion 130, a hash portion 132, a password hash portion 134, an encrypted master key portion 136, a random key generator portion 138, an encrypted master key portion 140 and a hash challenge portion 142. As non limiting examples, hash portion 124 and hash portion 132 may perform one-way hash operation.

Communication portion 116 receives information from username portion 118 via a communication channel 144. Hash portion 124 receives information from password portion via a communication channel 146. Symmetric encryption portion 126 receives information from password portion 120 via a communication channel 148 and from master key portion 128 via a communication channel 150. Symmetric encryption portion 130 receives information from challenge portion 122 via a communication channel 152 and from master key portion 128 via a communication channel 154. Hash portion 132 receives information from challenge portion 122 via a communication channel 156. Password hash portion 134 receives information from hash portion 124 via a communication channel 158. Encrypted master key portion 136 receives information from symmetric encryption portion 126 via a communication channel 160. Encrypted master key portion 140 receives information from symmetric encryption portion 130 via a communication channel 162. Hash challenge portion 142 receives information from hash portion 132 via a communication channel 164. Master key portion 128 receives information from random key generator portion 138 via a communication channel 166. Communication portion 116 receives information from password hash portion 134 via a communication channel 168, from encrypted master key portion 136 via a communication channel 170, from encrypted master key portion 140 via a communication channel 172 and from hash challenge portion 142 via a communication channel 174.

Username portion 118 performs processing and operations associated with usernames. Password portion 120 performs processing and operations associated with passwords. As a non-limiting example, password portion 120 may receive information associated with a current/existing password or may receive information associated with a new password. Challenge portion 122 performs processing and operations associated with security challenge questions. In some alternative embodiments, challenge portion 122 may support multiple security challenge questions. Hash portion 124 performs processing associated with a hash operation. Symmetric encryption portion 126 performs processing associated with symmetric encryption operations. As a non-limiting example, symmetric encryption portion 126 performs secret key encryption. Master key portion 128 performs processing and operations associated with a master key. Symmetric encryption portion 130 performs processing associated with symmetric encryption operations. Hash portion 132 performs processing associated with a hash operation. As a non-limiting example, hash portion 132 may perform a one-way has operation. Password hash portion 134 performs processing and operations associated with password hashes. Encrypted master key portion 136 performs processing and operations associated with encrypted master passwords. Random key generator portion 138 performs processing and operations associated with random key generation. Encrypted master key portion 140 performs processing and operations associated with an encrypted master. As a non-limiting example, encrypted master key portion 140 performs processing and operations associated with challenging an answer. Hash challenge portion 142 performs processing and operations associated with a hash for challenging answers. Server device 104 includes a communication portion 176 and a processing/storage portion 178.

Communication portion 176 receives, transmits and processes information. Processing/storage portion 178 performs processing and storage associated with server operations for receiving, transmitting, storing, retrieving and processing information.

Processing/storage portion 178 includes a username portion 180, a password hash portion 182, an encrypted master key portion 184, an encrypted master key portion 186 and a hash challenge portion 188.

Username portion 180 receives information from communication portion 176 via a communication channel 190. Password hash portion 182 receives information from communication portion 176 via a communication channel 192. Encrypted master key portion 184 receives information from communication portion 176 via a communication channel 194. Encrypted master key portion 186 receives information from communication portion 176 via a communication channel 196 and hash challenge portion 188 receives information from communication portion 176 via a communication channel 198.

Username portion 180 performs storage and processing associated with username. Password hash portion 182 performs storage and processing associated with password hash. Encrypted master key portion 184 performs storage and processing associated with encrypted master password. Encrypted master key portion 186 performs storage and processing associated with answers to challenge. Hash challenge portion 188 performs has associated with an answer to a challenge.

In operation user (not shown) is requested to provide username information, password information and an answer to a challenge question. As a non-limiting example, challenge question may be "What is your mother's maiden name"? In response to request, user provides username via username portion 118, password via password portion 120 and answer to challenge question via answer to challenge portion 122. Username information is communicated from username portion 118 to username portion 180 for storage and is communicated via communication portion 116, global communication network 106 and communication portion 176. Password information is received by hash portion 124 and a hash operation is performed to generate a hashed password. As a non-limiting example a one-way hash algorithm may be used such as SHA256. The SHA256 algorithm is a cryptographic hash function which stands for Secure Hash Algorithm and has four hash functions and has 256 bit digests. Furthermore, as a non-limiting example, hash operation may be performed by users' browser. Furthermore, as a non-limiting example, hash operation may be performed using JavaScript. JavaScript is a prototype-based scripting language that is dynamic, weakly typed, general purpose programming language and has first-class functions. The results of hash portion 124 are communicated to password hash portion 134. Furthermore, the hash information associated with password hash portion is then communicated to password hash portion 182 for storage via communication portion 116, global communication network 106 and communication portion 176. The unencrypted version of the password information is not communicated to server device 104. Random key generator portion 138 generates a random key. Random key is used by master key portion 128 to generate a master key or to be used as a master key. As a non-limiting example, the master key is a randomly generated AES key that is greater than or equal to 128 bits. AES stands for Advanced Encryption Standard and is used for the encryption of electronic information. AES is a symmetric-key algorithm, meaning the same key is used for encrypting and decrypting information. Furthermore, as a non-limiting example, the master key may be generated in the user's browser during account activation. Furthermore, the master key may be generated via JavaScript. Symmetric encryption portion 126 receives password information from password portion 120 and master key from master key portion 128 and encrypts the master key to form an "encrypted master key (using password)". The password is used indirectly as the key to the encryption operation. As a non-limiting example a PBKDF2 (Password-Based Key Derivation Function 2) like algorithm is used to generate a key to the symmetric encryption algorithm from the clear form of the password. As a non-limiting example, PBKDF2 is used to generate an AES Key (256 bit) from the password. The AES Key is then used to encrypt the Master Key. Furthermore, the "encrypted master key (using password)" is received by encrypted master key portion 136 associated with password. Encrypted master key portion 136 associated with password communicates encrypted master key (using password) to encrypted master key portion 184 associated with password for storage via communication portion 116, global communication network 106 and communication portion 176. The unencrypted answer to the challenge question is not communicated to server device 104. The answer to the challenge question is received by hash portion 132 for performing a hash operation to generate a challenge answer hash.

As a non-limiting example, the hash operation performed by hash portion 132 may be SHA256. Furthermore, as a non-limiting example, hash operation may be performed by users' browser. Furthermore, as a non-limiting example, hash operation may be performed using JavaScript. The challenge answer hash is received by hash challenge portion 142 and communicated to hash challenge portion 188 for storage via communication portion 116, global communication network 106 and communication portion 176. Symmetric encryption portion 130 receives master key from master key portion 128 and answer to challenge question from challenge portion 122 and encrypts the master key using the challenge answer to generate an "encrypted master key (using challenge answer)". The answer to the challenge question is used indirectly as the key to the encryption operation. As a non-limiting example, a PBKDF2 like algorithm is used to generate a key to the symmetric encryption algorithm from the answer to the challenge question. As a non-limiting example, PBKDF2 is used to generate an AES Key (256 bit) from the challenge answer. The AES Key is then used to encrypt the Master Key. Furthermore, encrypted master key (using challenge answer) is received by encrypted master key portion 140 associated with challenge answer which communicates the encrypted master key (using challenge answer) to encrypted master key portion 186 for storage via communication portion 116, global communication network 106 and communication portion 176. Two encrypted versions of the Master Key are stored on the server. One using the user's password and the other using the answer to the challenge question.

Master key is not accessible via persons associated with server device 104 and also not associated with computing device 102, as information associated with the master key is not communicated to server device 104. The encrypted forms of the master key may be decrypted using the user's original password or the user's answer to the challenge question. Furthermore, the original password information and the answer to the challenge question are not communicated to server device 104.

FIG. 1 is a block diagram of an example secure communication system where a username, a hash encrypted password, an encrypted master key (using the original password), another encrypted master key (using the answer to the challenge question) and a hash encrypted answer to the challenge question are securely stored on a server.

Figure 2:
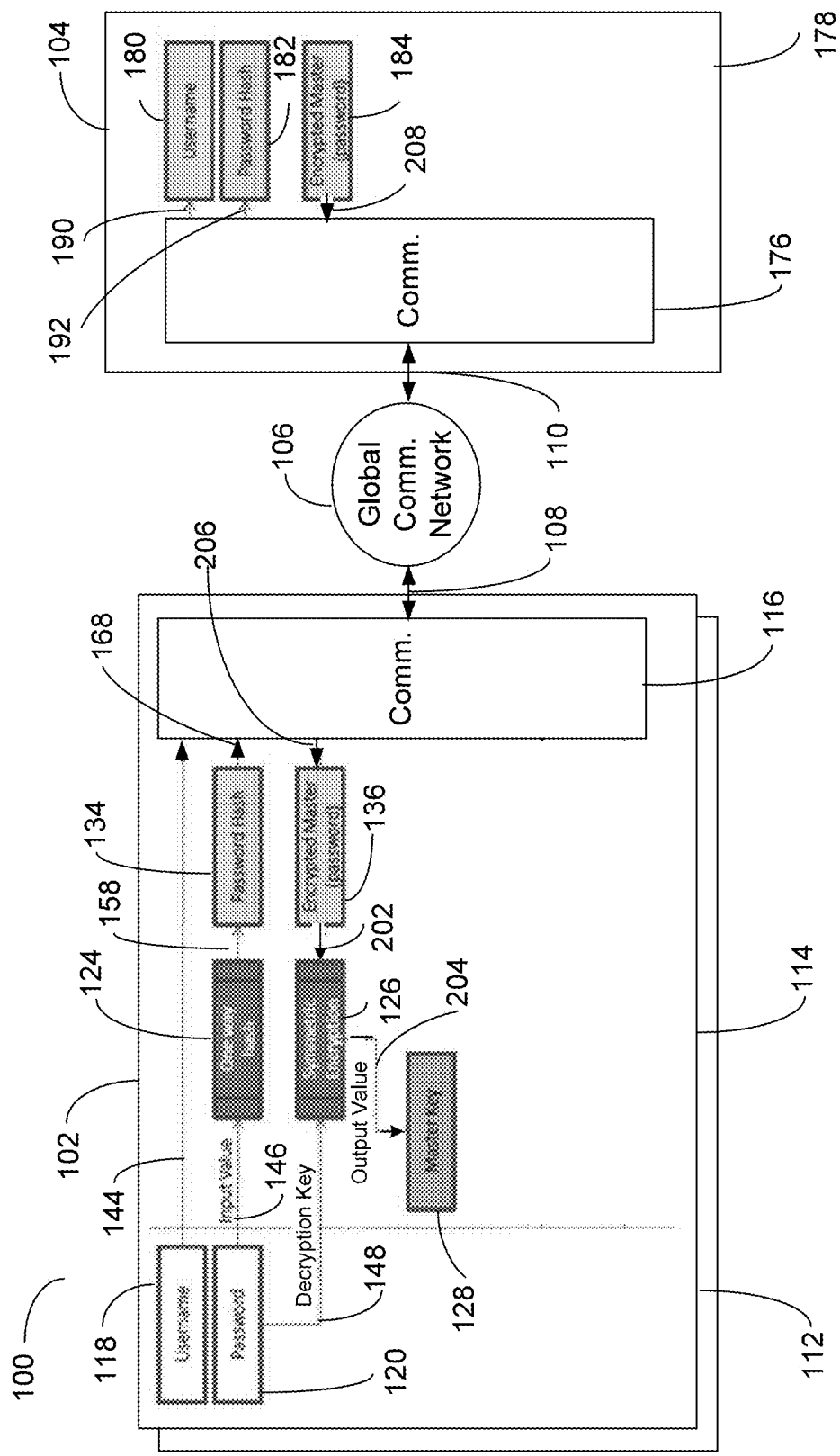
FIG. 2 is a block diagram of another example of the secure communication system as described with reference to FIG. 1, in accordance with an embodiment of the present invention.

FIG. 2 is a block diagram of another example of the secure communication system as described with reference to FIG. 1, in accordance with an embodiment of the present invention.

For the embodiment of FIG. 2 secure communication system 100 performs user login.

For the embodiment of FIG. 2, symmetric encryption portion 126 receives information from encrypted master key portion 136 via a communication channel 202. Master key portion 128 receives information from symmetric encryption portion 126 via a communication channel 204. Encrypted master key portion 136 receives information from communication portion 116 via a communication channel 206. Communication portion 176 receives information from encrypted master key portion 184 via a communication channel 208.

In operation, user is requested to provide username information and password information. The username information is received by username portion 118 and the password information is received by password portion 120. The username information is communicated from username portion 118 to username portion 180 for verification. The password information is received by hash portion 124 and a hash operation is performed to generate a hashed password using the same hash algorithm as used during user activation. The hashed password is received by password hash portion 134 and is communicated to password hash portion 182. The received hashed password is verified against the stored hashed password. If the username and hashed password match the stored values (user is authenticated), then the encrypted version of the user's master key is retrieved from encrypted master key portion 184 associated with password and is communicated to computing device 102. As a non-limiting example, the retrieved encrypted master key may be received by the browser executing on computing device 102. The clear form of the user password is then used to retrieve the clear form of the master key. The encrypted master key is decrypted using the same symmetric algorithm as used to encrypt it during the user activation operation. The clear form of the password is used indirectly as the key to the decryption operation. A PBKDF2 like algorithm is used to generate a key to the symmetric encryption algorithm from the password. The same PBKDF2 algorithm and parameters are used to generate the key as used during the encryption operation for user activation. The clear form of the master key is then used for content storage and retrieval. As a non-limiting example, the clear master key may be stored in the browser executing on computing device 102.

The login operation is performed securely, as the unencrypted password is not communicated to server device 104. Furthermore, the challenge answer is not used during the login process via challenge portion 122 as described with reference to FIG. 1.

Additional details associated with the operation secure communication system 100 with respect to FIG. 2 are described with reference to FIG. 12B.

FIG. 2 is a block diagram of another example of the secure communication system as described with reference to FIG. 1 where previously encrypted password information is securely retrieved for performing secure content storage and retrieval.

Figure 3:
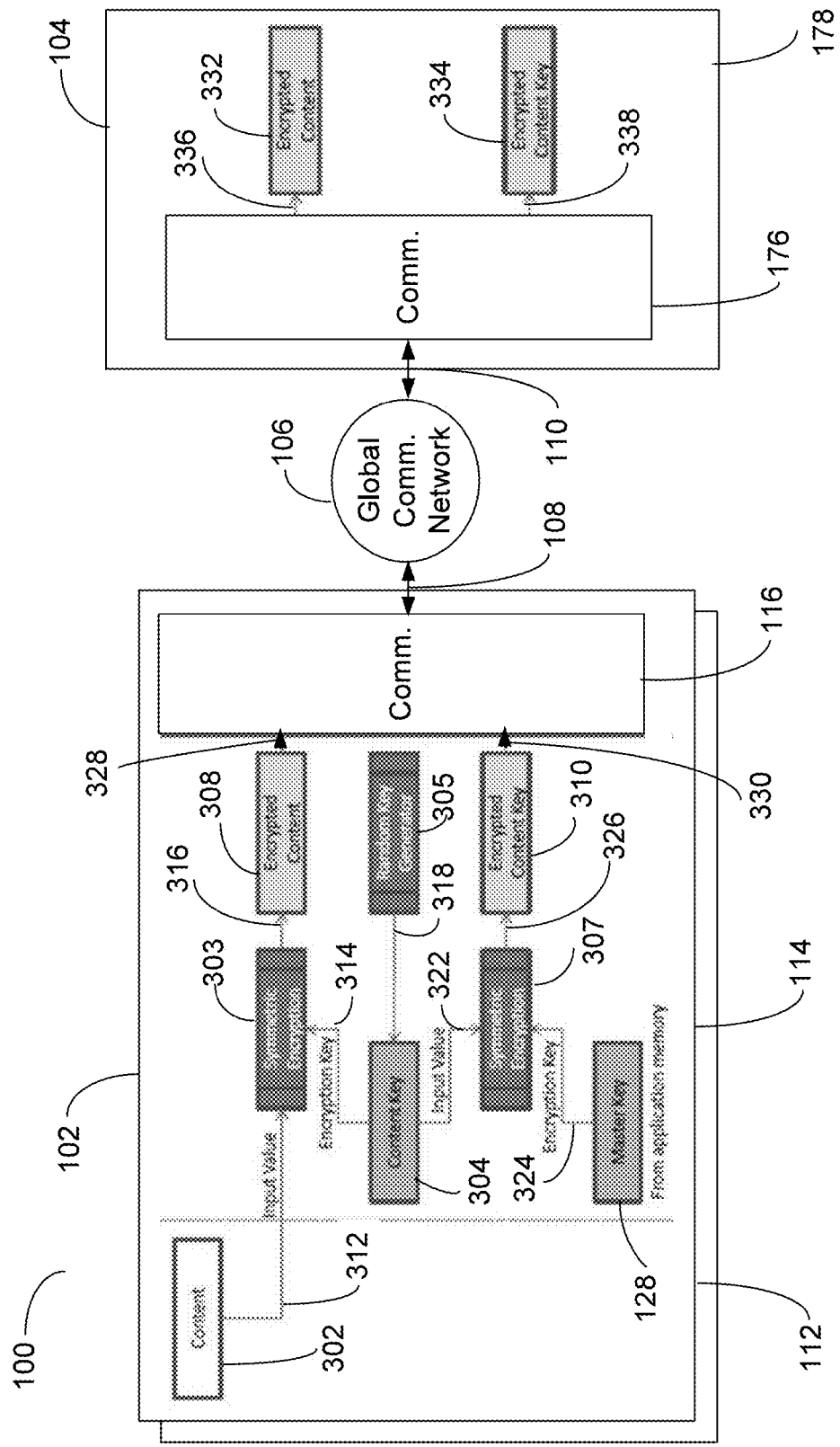
FIG. 3 is a block diagram of another example of the secure communication system as described with reference to FIG. 1, in accordance with an embodiment of the present invention.

FIG. 3 is a block diagram of another example of the secure communication system as described with reference to FIG. 1, in accordance with an embodiment of the present invention.

For the embodiment of FIG. 3 secure communication system 100 performs secure storage of content.

Application portion 114 includes a content portion 302, a symmetric encryption portion 303, a content key portion 304, a random key generator portion 305, a master key portion 306, a symmetric encryption portion 307, an encrypted content portion 308 and an encrypted content key portion 310.

Symmetric encryption portion 303 receives information from content portion 302 via a communication channel 312 and from content key portion 304 via a communication channel 314. Encrypted content portion 308 receives information from symmetric encryption portion 303 via a communication channel 316. Content key portion 304 receives information from random key generator portion 305 via a communication channel 318. Symmetric encryption portion 307 receives information from content key portion 304 via a communication channel 322 and from master key portion 128 via a communication channel 324. Encrypted content key portion 310 receives information from symmetric encryption portion 307 via a communication channel 326. Communication portion 116 receives information from encrypted content portion 308 via a communication channel 328 and from encrypted content key portion 310 via a communication channel 330.

Content portion 302 receives, transmits and presents content for viewing. Symmetric encryption portion 303 performs processing associated with symmetric encryption operations. As a non-limiting example, symmetric encryption portion 303 performs secret key encryption. Content key portion 304 provides processing and operations associated with content keys. Random key generator portion 305 performs processing and operations associated with random key generation. Master key portion 306 provides processing and operations associated with master keys. Symmetric encryption portion 307 performs processing associated with symmetric encryption operations. Encrypted content portion 308 provides processing and operations associated with encrypted content. Encrypted content key portion 310 provides processing and operations associated with encrypted content keys.

Server device 104 includes an encrypted content portion 332 and an encrypted content key portion 334.

Encrypted content portion 332 receives information from communication portion 176 via a communication channel 336. Encrypted content key portion 334 receives information from communication portion 176 via a communication channel 338.

Encrypted content portion 332 stores and processes information associated with encrypted content. Encrypted content key portion 334 stores and processes information associated with encrypted content keys.

In operation, content key portion 304 receives a random key from random key generator portion 305 in order to generate a content key or to use random key as a content key. As a non-limiting example, content key may be generated for AES encryption. Content information is received from user via content portion 302. Symmetric encryption portion 303 then receives content from content portion 302 and content key from content key portion 304 for generating encrypted content. The content key is used as the key to the encryption operation. As a non-limiting example, the content may be encrypted via the user's browser. The encrypted content is received by encrypted content portion 308 and communicated to encrypted content portion 332. Symmetric encryption portion 307 receives content key from content key portion 304, receives master key from master key portion 128 and encrypts content key to form encrypted content key. The master key is used as the key to the encryption operation. As a non-limiting example, master key may be retrieved from the user's browser session storage. Encrypted content key is received by encrypted content key portion 310 and is communicated to encrypted content key portion 334.

Content communicated to server device 104 is secure, as decryption keys needed for decryption are not available outside of computing device 102. The content information is encrypted as well as the content key. The content key is encrypted via the master key. The master key is encrypted using the user password information. The clear form of the user password information is not transported or saved on server device 104.

FIG. 3 is a block diagram of another example of the secure communication system as described with reference to FIG. 1 where content and a content key are encrypted and securely stored on a server while unencrypted password information is retained on computing device 102 and is not communicated to server.

Figure 4:
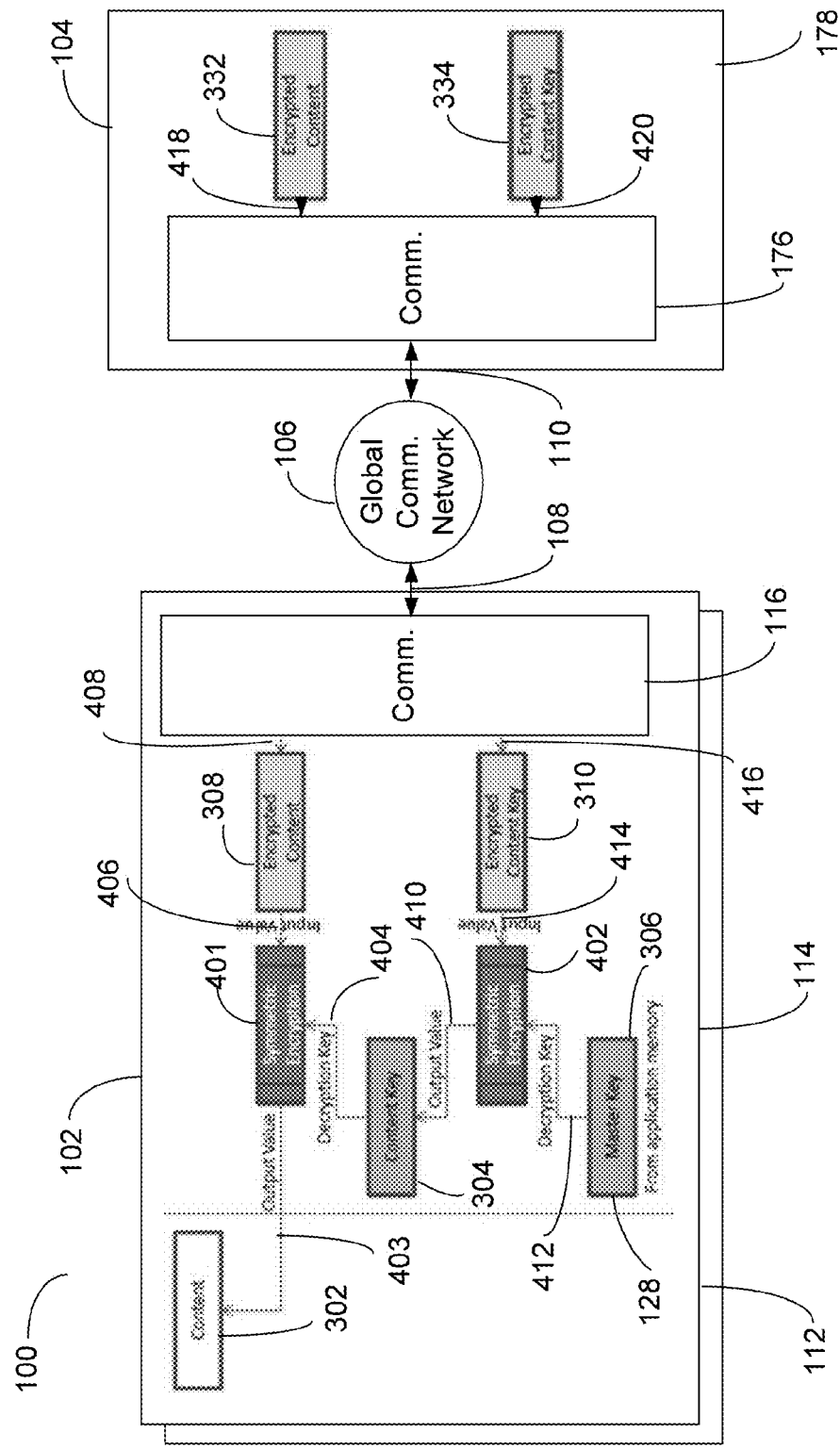
FIG. 4 is a block diagram of another example of the secure communication system as described with reference to FIG. 1, in accordance with an embodiment of the present invention.

FIG. 4 is a block diagram of another example of the secure communication system as described with reference to FIG. 1, in accordance with an embodiment of the present invention.

For the embodiment of FIG. 4 secure communication system 100 performs secure retrieval of content.

Computing device 102 includes the elements as described with reference to FIG. 3 in addition to a symmetric encryption portion 401 and a symmetric encryption portion 402.

Content portion 302 receives information from symmetric encryption portion 401 via a communication channel 403. Symmetric encryption portion 401 receives information from content key portion 304 via a communication channel 404 and from encrypted content portion 308 via a communication channel 406. Encrypted content portion 308 receives information from communication portion 116 via a communication channel 408. Content key portion 304 receives information from symmetric encryption portion 402 via a communication channel 410. Symmetric encryption portion 402 receives information from master key portion 128 via a communication channel 412 and from encrypted content key portion 310 via a communication channel 414. Encrypted content key portion 310 receives information from communication portion 116 via a communication channel 416.

Server device 104 includes elements as described with reference to FIG. 3.

Communication portion 176 receives information from encrypted content portion 332 via a communication channel 418 and from encrypted content key portion 334 via a communication channel 420.

Symmetric encryption portion 401 and symmetric encryption portion 402 perform processing associated with symmetric encryption operations. As a non-limiting example, symmetric encryption portion 401 and symmetric encryption portion 402 perform secret key encryption. Master key portion 128 performs processing and operations associated with a master key.

In operation, encrypted content is retrieved from encrypted content portion 332 and received by encrypted content portion 308. Encrypted content key is retrieved from encrypted content key portion 334 and received by encrypted content key portion 310. As a non-limiting example, encrypted content and encrypted content key may be received by a browser executing on computing device 102. Symmetric encryption portion 402 receives encrypted content key from encrypted content key portion 310, receives master key from master key portion 128 and performs decryption of the content key in order to generate the clear or unencrypted version of the content key. The master key is used as the key for the decryption operation. The decryption algorithm is the same as the one used during the encryption of the content key in the content storage operation. Furthermore, unencrypted version of the content key is received by content key portion 304. As a non-limiting example, the master key may be stored in the session storage associated with the browser executing on computing device 102. Symmetric encryption portion 401 receives encrypted content from encrypted content portion 308 and receives content key from content key portion 304 and performs decryption of the encrypted content in order to generate the unencrypted version of the content. The content key is used as the key for the decryption operation. The decryption algorithm is the same as the one used during the encryption of the content in the content storage operation. Furthermore, the unencrypted version of the content is received by content portion 302. Furthermore, unencrypted content may be provided to user. Non-limiting examples of content which may be unencrypted in this manner include text, audio, image, video and documents.

FIG. 4 is a block diagram of another example of the secure communication system as described with reference to FIG. 1 where an encrypted content key is securely decrypted in order to securely decrypt encrypted content.

Figure 5:
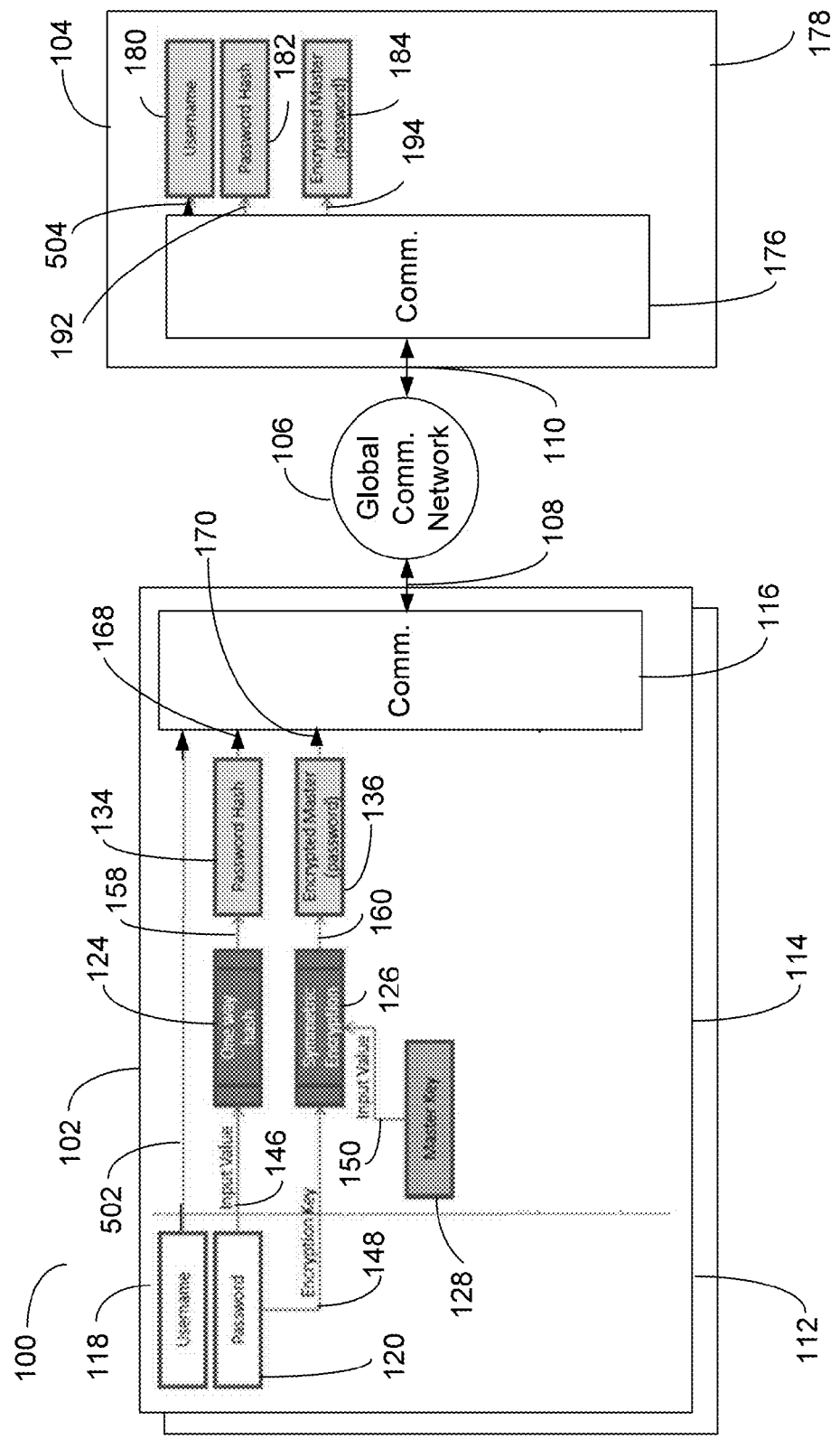
FIG. 5 is a block diagram of another example of the secure communication system as described with reference to FIG. 1, in accordance with an embodiment of the present invention.

FIG. 5 is a block diagram of another example of the secure communication system as described with reference to FIG. 1, in accordance with an embodiment of the present invention.

For the embodiment of FIG. 5 secure communication system 100 performs secure change of password.

Application portion 114 includes username portion 118, password portion 120, hash portion 124, master key portion 128, password hash portion 134 and encrypted master key portion 136.

Server device 104 includes username portion 180, password hash portion 182 and encrypted master key portion 184.

Communication portion 116 receives information from username portion 118 via a communication channel 502.

Username portion 180 receives information from communication portion 176 via a communication channel 504.

In operation, user is prompted to provide username and password information. Username information is received by username portion 118 and password information is received by password portion 120. Username/password information is authenticated. User is prompted to enter new password information. New password information is received by password portion 120. Symmetric encryption portion 126 receives master key from master key portion 128, receives new password information from password portion 120 and performs an encryption of the master key to create a new encrypted master key (using new password). The new password is used indirectly as the key to the encryption operation. As a non-limiting example, a PBKDF2 like algorithm is used to generate a key to the symmetric encryption algorithm from the new password. Furthermore, encrypted master key (using new password) is received by encrypted master key portion 136 with respect to using a new password. As a non-limiting example, master key may be made available by the browser executing on computing device 102. The new encrypted master key (using new password) is received by encrypted master key portion 184 associated with password from encrypted master key portion 136 associated with new password and replaces the earlier value of the encrypted master key (using password) on the server. Hash portion 124 receives new password and performs a hash operation to generate a hashed password. As a non-limiting example hash operation performed may be SHA256. Hashed password is received by password hash portion 134 and is communicated to password hash portion 182 replacing the earlier value. During the password change procedure, the master key is not communicated to server device 104 or stored on server device 104. Furthermore, during the password change, the new user password is not communicated to server device 104 or stored on server device 104.

FIG. 5 is a block diagram of another example of the secure communication system as described with reference to FIG. 1 where a password may be securely modified.

Figure 6:
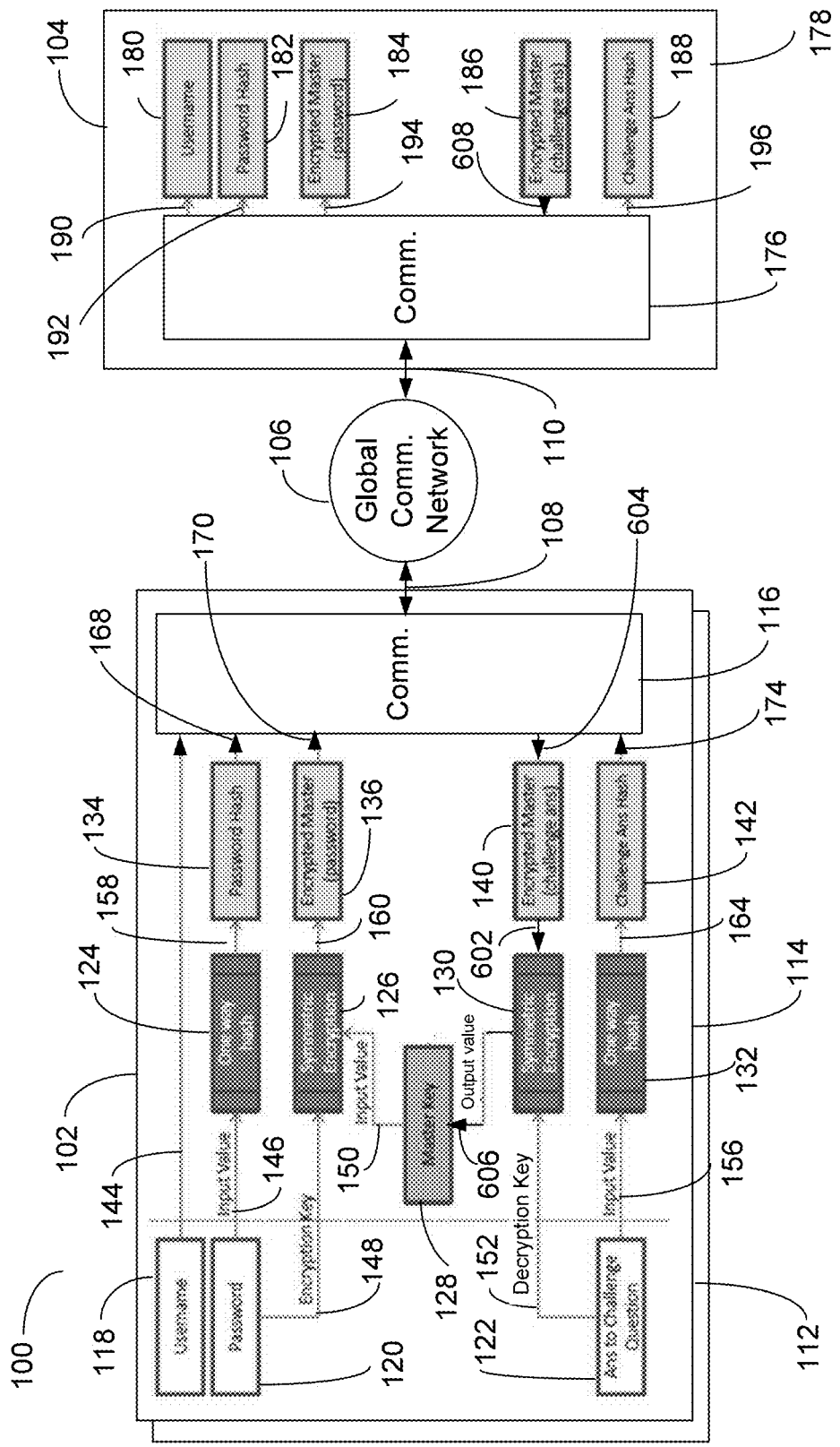
FIG. 6 is a block diagram of another example of the secure communication system as described with reference to FIG. 1, in accordance with an embodiment of the present invention.

FIG. 6 is a block diagram of another example of the secure communication system as described with reference to FIG. 1, in accordance with an embodiment of the present invention.

For the embodiment of FIG. 6 secure communication system 100 performs secure reset of password.

Secure communication system 100 includes some of the elements as described with reference to FIG. 1.

Symmetric encryption portion 130 receives information from encrypted master key portion 140 via a communication channel 602. Encrypted master key portion 140 receives information from communication portion 116 via a communication channel 604. Master key portion 128 receives information from symmetric encryption portion 130 via a communication channel 606.

Communication portion 176 receives information from encrypted master key portion 186 via a communication channel 608.

In operation, user is prompted to enter username, answer to challenge security question and new password information. Username portion 118 receives username information. Password portion 120 receives new password information. Challenge portion 122 receives answer to challenge security question. The answer to the challenge question is hashed using the same algorithm used during user activation. The hashed value is communicated to the server and is compared with hash challenge portion 188 (hashed value of the challenge answer as stored on the server). If the hashed values are the same (user is authentic) then the user's encrypted master key, encrypted using the answer to the challenge security question performed during the activation process as described with reference to FIG. 1 is retrieved from encrypted master key portion 186, associated with challenge answer, and is received by encrypted master key portion 140. As a non-limiting example, the encrypted master key may be received by the browser executing on computing device 102. Symmetric encryption portion 130 receives the encrypted master key, receives the answer to the challenge question from challenge portion 122 and performs decryption of the encrypted master key in order to generate the master key in the clear form. The answer to the challenge question is used indirectly as the key to the decryption operation. A PBKDF2 like algorithm is used to generate a key to the symmetric encryption algorithm from the answer to the challenge question. The same algorithm and parameters are used to decrypt as used during the encryption of the master key in the user activation operation. Symmetric encryption portion 126 receives master key from master key portion 128, receives new password from password portion 120 and performs encryption of the master key for generating a new encrypted master key (using password). The new password is used indirectly as the key to the encryption operation. A PBKDF2 like algorithm is used to generate a key to the symmetric encryption algorithm from the new password. Furthermore, new encrypted master key (using password) is received by encrypted master key portion 136 associated with password. Encrypted master key portion 184 associated with password receives new encrypted master key from encrypted master key portion 136 associated with password and replaces old encrypted master key with new encrypted master key. Hash portion 124 receives the new password from password portion 120 and performs a hash operation in order to generate a new hashed password. As a non-limiting example, the hash operation may be performed via SHA256. Password hash portion 134 receives hashed password from hash portion 124. Password hash portion 182 receives new hashed password from password hash portion 134 and replaces old hashed password with new hashed password.

During the process of resetting the password, the unencrypted master key and the unencrypted answer to the challenge security question and the unencrypted new user password are not communicated to or stored on server device 104.

FIG. 6 is a block diagram of another example of the secure communication system as described with reference to FIG. 1 where a password may be securely reset.

Figure 7:
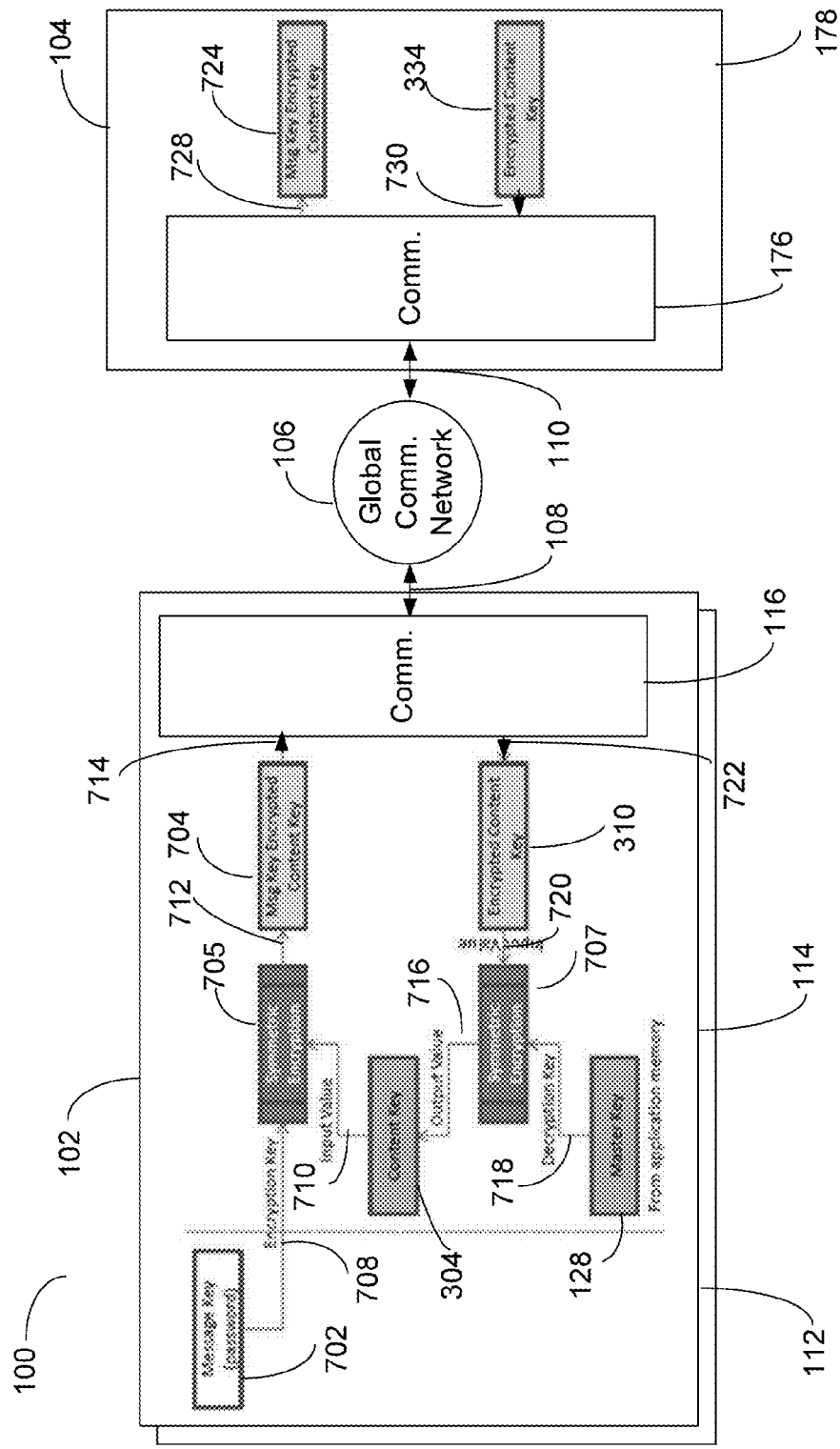
FIG. 7 is a block diagram of another example of the secure communication system as described with reference to FIG. 1, in accordance with an embodiment of the present invention.

FIG. 7 is a block diagram of another example of the secure communication system as described with reference to FIG. 1, in accordance with an embodiment of the present invention.

For the embodiment of FIG. 7 secure communication system 100 provides configuration for providing (or sending) content to a receiving or guest user. As a non-limiting example, the receiving or guest user may not have an account with the service provider.

Application portion 114 includes master key portion 128, a symmetric encryption portion 705, a symmetric encryption portion 707, content key portion 304, encrypted content key portion 310, a message key portion 702 and a message key encrypted content key portion 704.

Symmetric encryption portion 705 receives information from message key portion 702 via a communication channel 708 and from content key portion 304 via a communication channel 710. Message key encrypted content key portion 704 receives information from symmetric encryption portion 705 via a communication channel 712. Communication portion 116 receives information from message key encrypted content key portion 704 via a communication channel 714. Content key portion 304 receives information from symmetric encryption portion 707 via a communication channel 716. Symmetric encryption portion 707 receives information from master key portion 128 via a communication channel 718. Symmetric encryption portion 707 receives information from encrypted content key portion 310 via a communication channel 720. Encrypted content key portion 310 receives information from communication portion 116 via a communication channel 722.

Server device 104 includes encrypted content key portion 334 and a message key encrypted content key portion 724.

Message key encrypted content key portion 724 receives information from communication portion 176 via a communication channel 728. Communication portion 176 receives information from encrypted content key portion 334 via a communication channel 730.

Message key portion 702 receives information associated with a message key password. Message key encrypted content key portion 704 performs operation associated with generating a message key encrypted content key.

Symmetric encryption portion 705 and symmetric encryption portion 707 perform processing associated with symmetric encryption operations. As a non-limiting example, symmetric encryption portion 705 and symmetric encryption portion 705 perform secret key encryption. Message key encrypted content key portion 724 performs storage and retrieval of information associated with a message key encrypted content key.

In operation, user is prompted to enter a message key. A message key is similar to a password and provides secure access to encrypted content to a receiving user. Encrypted content key is received by encrypted content key portion 310 from encrypted content key portion 334. Symmetric encryption portion 707 receives encrypted content key from encrypted content key portion 310, receives master key from master key portion 128 and performs decryption of the encrypted content key to generate the unencrypted content key. The master key is used as the key to the decryption operation. The same algorithm and parameters are used to decrypt as used during the encryption of the content key in the content storage operation. Furthermore, the unencrypted content key is received by content key portion 304. Symmetric encryption portion 705 receives content key from content key portion 304, receives message key from message key portion 702 and performs encryption of content key using message key to generate a message key encrypted content key. If the message key is a user entered passphrase, a PBKDF2 like algorithm is used to generate a key for the symmetric encryption using the message key. Message key encrypted content key is received by message key encrypted content key portion 704 from symmetric encryption portion 705. Message key encrypted content key portion 724 receives message key encrypted content key from message key encrypted content key portion 704. Unencrypted message key is not communicated to or stored on server device 104. Receiving user (not shown) via receiving user computing device is notified of message key and of content available for delivery. As a non-limiting example, the message key may be a password that is used to perform the content exchange and is known to the user and the guest user. Different communication conduits may be used for communication of information and communication of message key in order to prevent compromise of the information. As a non-limiting example, information may be communicated via a network and the message key may be communicated by telephone.

FIG. 7 is a block diagram of another example of the secure communication system as described with reference to FIG. 1 where a message key is used to encrypt content, the message key is encrypted and the encrypted content and encrypted message key are stored on server.

Figure 8:
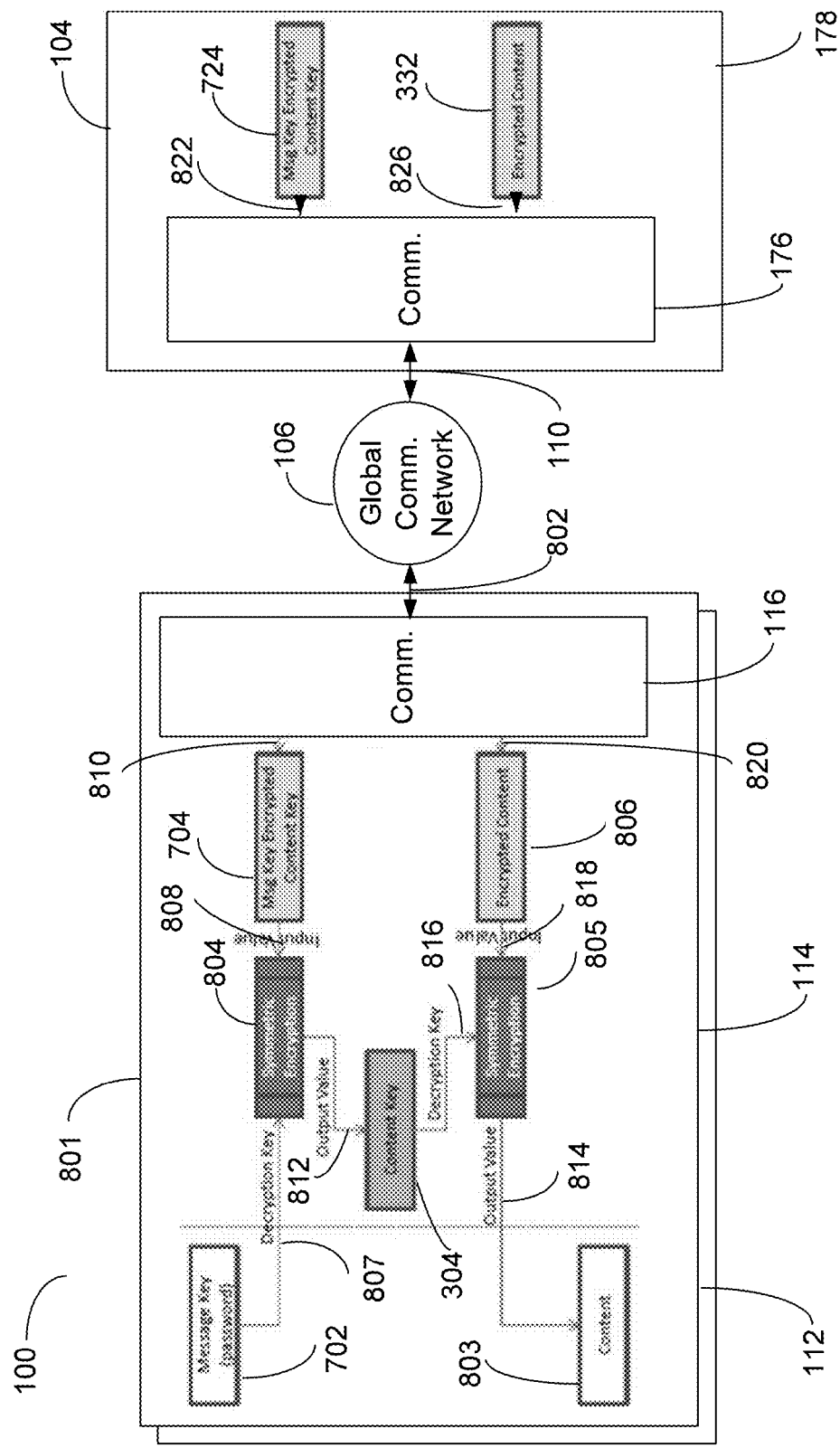
FIG. 8 is a block diagram of another example of the secure communication system as described with reference to FIG. 1, in accordance with an embodiment of the present invention.

FIG. 8 is a block diagram of another example of the secure communication system as described with reference to FIG. 1, in accordance with an embodiment of the present invention.

For the embodiment of FIG. 8 secure communication system 100 provides content to a receiving/guest user.

Secure communication system 100 includes a computing device 801, server device 104 and global communication network 106.

Computing device 801 operates similar to computing device 102 as described with reference to FIG. 1, except computing device 801 provides an interface to a receiving user.

Computing device 801 communicated bi-directionally with global communication network 106 via a communication channel 802.

Application portion 114 includes content key portion 304, message key portion 702, message key encrypted content key portion 704, a content portion 803, a symmetric encryption portion 804, a symmetric encryption portion 805 and an encrypted content portion 806.

Symmetric encryption portion 804 receives information from message key portion 702, associated with message password, via a communication channel 807 and from message key encrypted content key portion 704 via a communication channel 808. Message key encrypted content key portion 704 receives information from communication portion 116 via a communication channel 810. Content key portion 304 receives information from symmetric encryption portion 804 via a communication channel 812. Content portion 803 receives information from symmetric encryption portion 805 via a communication channel 814. Symmetric encryption portion 805 receives information from content key portion 304 via a communication channel 816. Symmetric encryption portion 805 receives information from encrypted content portion 806 via a communication channel 818. Encrypted content portion 806 receives information from communication portion 116 via a communication channel 820.

Server device 104 includes encrypted content portion 332 and message key encrypted content key portion 724.

Communication portion 176 receives information from message key encrypted content key portion 724 via a communication channel 822 and from encrypted content portion 332 via a communication channel 826.

Symmetric encryption portion 804 and symmetric encryption portion 805 perform processing associated with symmetric encryption operations. As a non-limiting example, symmetric encryption portion 804 and symmetric encryption portion 805 perform secret key encryption. Encrypted content portion 806 receives and transmits encrypted content.

In operation, receiving guest user is notified of availability of content. The guest user is notified of the message key by the sending user, preferably via a communication medium different from what is used to communicate availability of content. As a non-limiting example, receiving user provides and receives information via a browser executing on computing device 801. Further, as a non-limiting example, browser supports execution of JavaScript. Receiving user is prompted to enter message key which has been provided by user. Message key is received by message key portion 702 from receiving user. Message key encrypted content key portion 704 receives message key encrypted content key from message key encrypted content key portion 724 via communication portion 176, global communication network 106 and communication portion 116. Symmetric encryption portion 804 receives message key from message key portion 702, receives message key encrypted content key from message key encrypted content key portion 704 and performs decryption of the encrypted content key to generate unencrypted content key. The message key is used as the key for the decryption operation. If the message key is a user entered passphrase, a PBKDF2 like algorithm is used to create a key for the symmetric encryption algorithm using the message key. The algorithms and parameters are the same as used to encrypt the content key during the send operation by the user. Unencrypted content key is received by content key portion 304. As a non-limiting example, decryption of content key may be performed by browser executing on computing device 801. Furthermore, decryption may be performed using JavaScript. Encrypted content is received by encrypted content portion 806 from encrypted content portion 332. Symmetric encryption portion 805 receives encrypted content from encrypted content portion 806, receives content key from content key portion 304 and performs decryption of the encrypted content in order to generate unencrypted content. The content key is used as the key for the decryption operation. The algorithms and parameters are the same as used to encrypt the content during the content storage operation. Content portion 803 receives unencrypted content from symmetric encryption portion 805. Unencrypted content is provided to user. If the message key is incorrect, the content key would be incorrect and the content would be incorrect as well. Errors during the decryption would indicate bad message key. Non-limiting examples of content include text, image, video, electronic documents and file.

FIG. 8 is a block diagram of another example of the secure communication system as described with reference to FIG. 1 where encrypted content is decrypted and provided to a receiving user.

Figure 9:
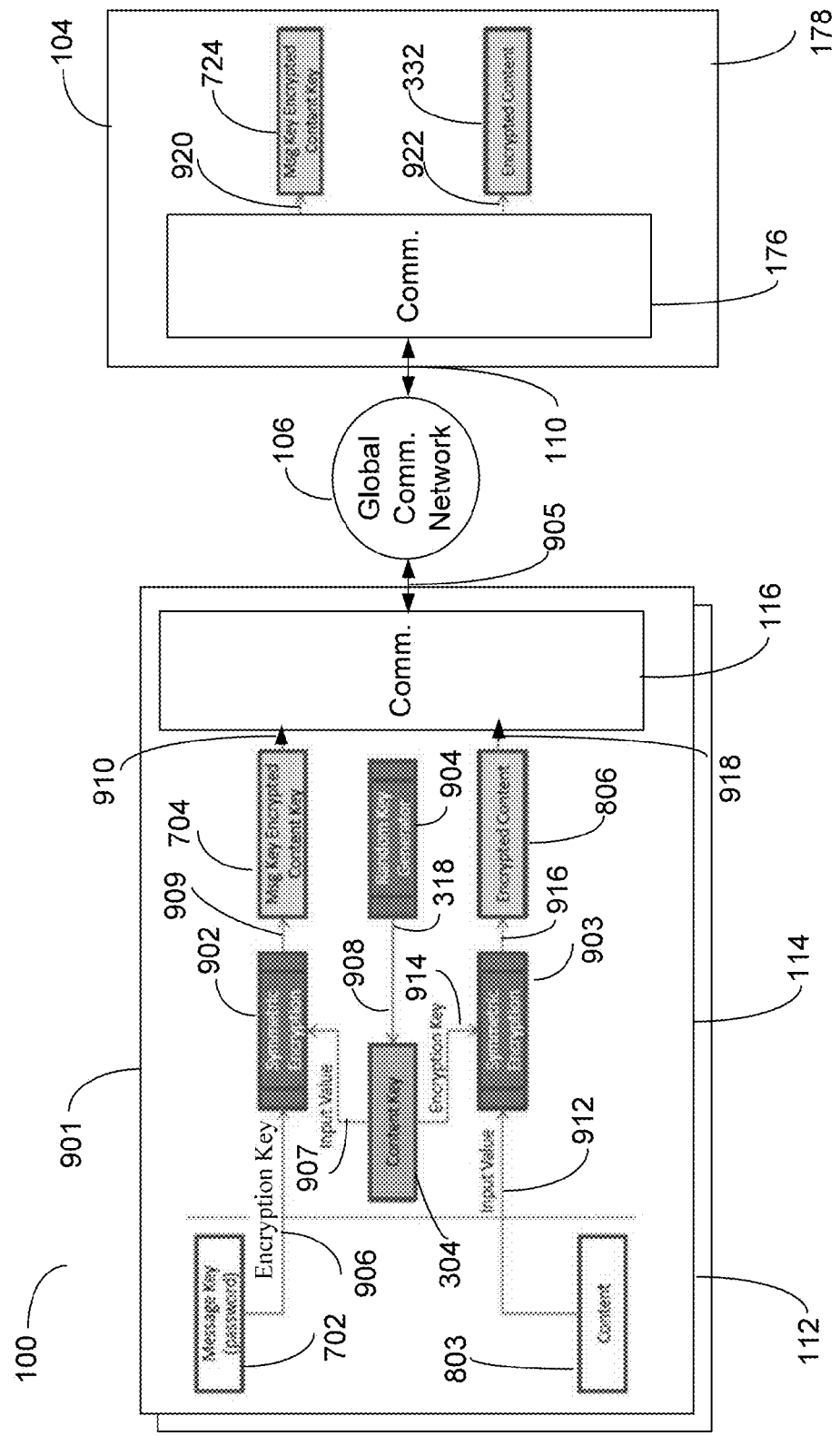
FIG. 9 is a block diagram of another example of the secure communication system as described with reference to FIG. 1, in accordance with an embodiment of the present invention.

FIG. 9 is a block diagram of another example of the secure communication system as described with reference to FIG. 1, in accordance with an embodiment of the present invention.

For the embodiment of FIG. 9 secure communication system 100 provides delivery of content from a transmitting/guest user to a server for retrieval by a user.

Secure communication system 100 includes a computing device 901, a symmetric encryption portion 902, a symmetric encryption portion 903, a random key generator portion 904, server device 104 and global communication network 106.

Computing device 901 communicates bi-directionally with global communication network 106 via a communication channel 905.

Computing device 901 operates in a similar manner as computing device 102 as described with reference to FIG. 1 and computing device 801 as described with reference to FIG. 8, except computing device 801 provides an interface to a transmitting user.

Symmetric encryption portion 902 receives information from message key portion 702 via a communication channel 906 and from content key portion 304 via a communication channel 907. Content key portion 304 receives information from random key generator portion 904 via a communication channel 908. Message key encrypted content key portion 704 receives information from symmetric encryption portion 902 via a communication channel 909. Communication portion 116 receives information from message key encrypted content key portion 704 via a communication channel 910. Symmetric encryption portion 903 receives information from content portion 803 via a communication channel 912 and from content key portion 304 via a communication channel 914.

Encrypted content portion 806 receives information from symmetric encryption portion 903 via a communication channel 916. Communication portion 116 receives information from encrypted content portion 806 via a communication channel 918.

Message key encrypted content key portion 724 receives information from communication portion 176 via a communication channel 920. Encrypted content portion 332 receives information from communication portion 176 via a communication channel 922.

Symmetric encryption portion 902 and symmetric encryption portion 903 perform processing associated with symmetric encryption operations. As a non-limiting example, symmetric encryption portion 902 and symmetric encryption portion 903 perform secret key encryption. Random key generator portion 904 performs processing and operations associated with random key generation.

In operation, transmitting guest user is prompted to enter a message key. Content information is also received from guest user via content portion 803. Message key is received by message key portion 702. Content key portion 304 receives a new random key from random key generator portion 904. As a non-limiting example, content key is generated for AES encryption. Furthermore, as a non-limiting example, generation of content key may be performed via browser executing on computing device 901. Symmetric encryption portion 903 receives content key from content key portion 304, receives content from content portion 803 and performs encryption of the content to generate encrypted content. The content key is used as the encryption key. Encrypted content is received by encrypted content portion 806. Encrypted content portion 332 receives encrypted content from encrypted content portion 806. Symmetric encryption portion 902 receives message key from message key portion 702, receives content key from content key portion 304 and performs encryption of the content key to generate a message key encrypted content key. The message key is used as the key to the encryption algorithm. If the message key is a user entered passphrase, a PBKDF2 like algorithm is used to generate a key for the symmetric encryption using the message key. Message key encrypted content key is received by message key encrypted content key portion 704. Message key encrypted content key portion 724 receives message key encrypted content key from message key encrypted content key portion 704 via communication portion 116, global communication network 106 and communication portion 176. Unencrypted message key is not communicated to or stored on server device 104. User is notified of available content from transmitting guest user.

FIG. 9 is a block diagram of another example of the secure communication system as described with reference to FIG. 1 where an encrypted message key and encrypted content is communicated and stored on a server by a transmitting user.

Figure 10:
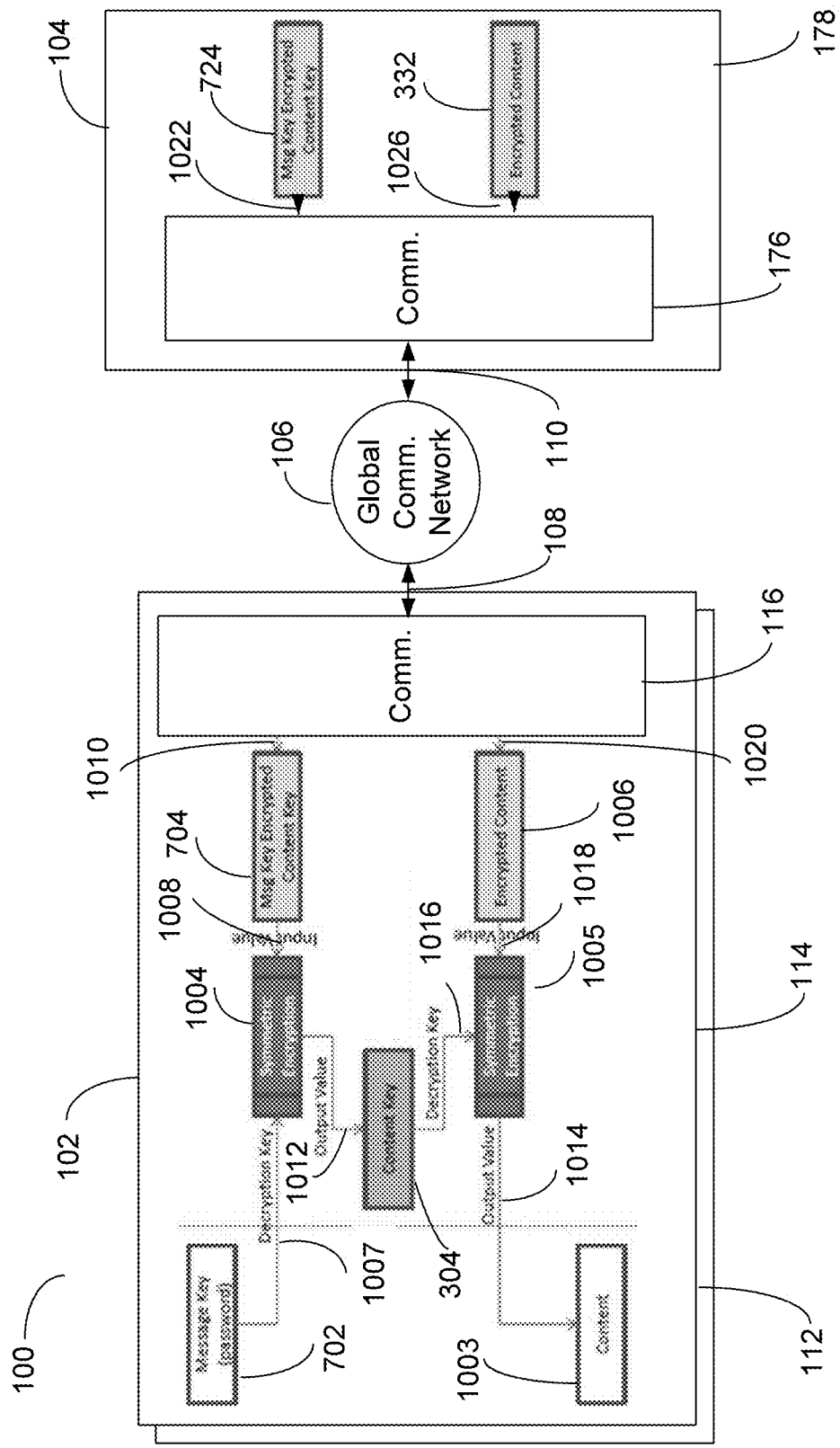
FIG. 10 is a block diagram of another example of the secure communication system as described with reference to FIG. 1, in accordance with an embodiment of the present invention.

FIG. 10 is a block diagram of another example of the secure communication system as described with reference to FIG. 1, in accordance with an embodiment of the present invention.

For the embodiment of FIG. 10 secure communication system 100 provides content to a user communicated from transmitting guest user.

Secure communication system 100 includes computing device 102, server device 104 and global communication network 106.

Application portion 114 includes a symmetric encryption portion 1004, a symmetric encryption portion 1005, content key portion 304, message key portion 702, message key encrypted content key portion 704, a content portion 1003 and an encrypted content portion 1006.

Symmetric encryption portion 1004 receives information from message key portion 702 via a communication channel 1007 and from message key encrypted content key portion 704 via a communication channel 1008. Message key encrypted content key portion 704 receives information from communication portion 116 via a communication channel 1010. Content key portion 304 receives information from symmetric encryption portion 1004 via a communication channel 1012. Content portion 1003 receives information from symmetric encryption portion 1005 via a communication channel 1014. Symmetric encryption portion 1005 receives information from content key portion 304 via a communication channel 1016. Symmetric encryption portion 1005 receives information from encrypted content portion 1006 via a communication channel 1018. Encrypted content portion 1006 receives information from communication portion 116 via a communication channel 1020.

Server device 104 includes encrypted content portion 332 and message key encrypted content key portion 724.

Communication portion 176 receives information from message key encrypted content key portion 724 via a communication channel 1022 and from encrypted content portion 332 via a communication channel 1026.

Symmetric encryption portion 1004 and symmetric encryption portion 1005 perform processing associated with symmetric encryption operations. As a non-limiting example, symmetric encryption portion 1004 and symmetric encryption portion 1005 perform secret key encryption.

In operation, receiving user is notified of availability of content and of the message key (using different communication mediums). As a non-limiting example, receiving user provides and receives information via a browser executing on computing device 102. Further, as a non-limiting example, browser supports execution of JavaScript. User is prompted to enter message key which has been provided by user initially or a new message key communicated to user by transmitting user. Message key is received by message key portion 702 from receiving user. Message key encrypted content key portion 704 receives message key encrypted content key from message key encrypted content key portion 724 via communication portion 176, global communication network 106 and communication portion 116. Symmetric encryption portion 1004 receives message key from message key portion 702, receives message key encrypted content key from message key encrypted content key portion 704 and performs decryption of the encrypted content key to generate unencrypted content key. The message key is used as the key for the decryption operation. If the message key is a user entered passphrase, a PBKDF2 like algorithm is used to create a key for the symmetric encryption algorithm using the message key. The algorithms and parameters are the same as used during the send operation by the transmitting user. Unencrypted content key is received by content key portion 304. As a non-limiting example, decryption of content key may be performed by browser executing on computing device 102. Furthermore, decryption may be performed using JavaScript. Encrypted content is received by encrypted content portion 1006 from encrypted content portion 332. Symmetric encryption portion 1005 receives encrypted content from encrypted content portion 1006, receives content key from content key portion 304 and performs decryption of the encrypted content in order to generate unencrypted content. The content key is used as the key for the decryption operation. The algorithms and parameters are the same as used during the send operation by the transmitting user. Content portion 1003 receives unencrypted content from symmetric encryption portion 1005.

Unencrypted content is provided to user. Non-limiting examples of content include text, image, video, electronic documents and file.

FIG. 10 is a block diagram of another example of the secure communication system as described with reference to FIG. 1 where encrypted content is decrypted and provided to a user by a transmitting user.

Figure 11:
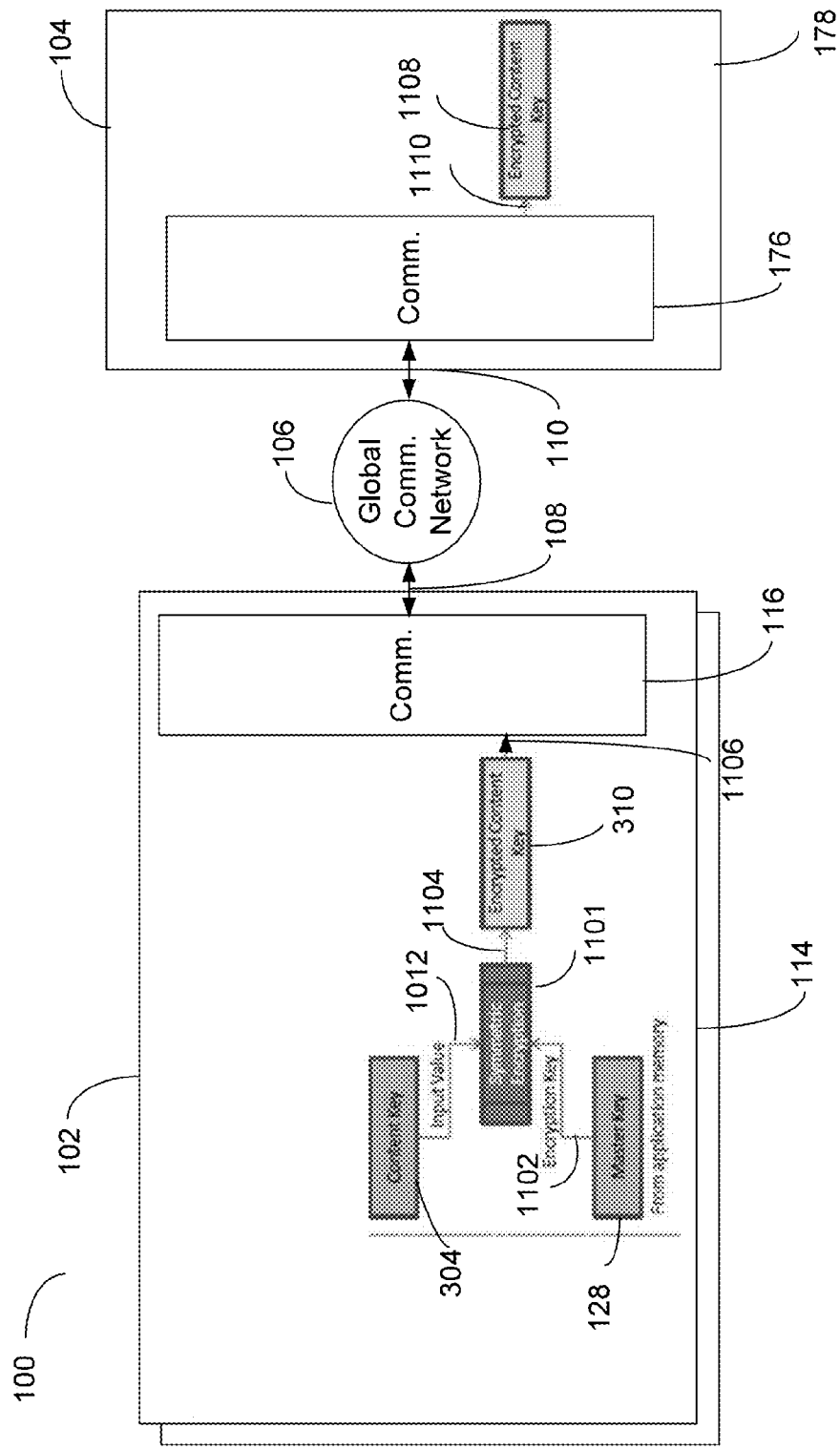
FIG. 11 is a block diagram of another example of the secure communication system as described with reference to FIG. 1 and is a continuation of the operation as described with reference to FIG. 10, in accordance with an embodiment of the present invention.

FIG. 11 is a block diagram of another example of the secure communication system as described with reference to FIG. 1 and is a continuation of the operation as described with reference to FIG. 10, in accordance with an embodiment of the present invention.

For the embodiment of FIG. 11 secure communication system 100 provides communication of re-encrypted content key to server such that user can use the re-encrypted content key to retrieve the content again as needed.

Application portion 114 includes master key portion 128, a symmetric encryption portion 1101, content key portion 304 and encrypted content key portion 310.

Symmetric encryption portion 1101 receives information from content key portion 304 via communication channel 1012 and receives information from master key portion 128 via a communication channel 1102. Encrypted content key portion 310 receives information from symmetric encryption portion 1101 via a communication channel 1104. Communication portion 116 receives information from encrypted content key portion 310 via a communication channel 1106.

Server device 104 includes an encrypted content key portion 1108.

Encrypted content key portion 1108 receives information from communication portion 176 via a communication channel 1110.

Symmetric encryption portion 1101 performs processing associated with symmetric encryption operations. As a non-limiting example, symmetric encryption portion 1101 performs secret key encryption. Encrypted content key portion 1108 performs receipt, storage and retrieval of encrypted content key information.

Operation of FIG. 11 is a continuation of the operation as described with reference to FIG. 10. Following the operation as described with reference to FIG. 10, symmetric encryption portion 1101 receives content key from content key portion 304, receives master key from master key portion 128 and performs encryption of the content key to generate a re-encrypted version of the content key. The master key is used as the key to the encryption operation. Encrypted content key portion 310 receives the re-encrypted content key from symmetric encryption portion 1101. Encrypted content key portion 1108 receives re-encrypted content key from encrypted content key portion 310.

FIG. 11 is a block diagram of another example of the secure communication system as described with reference to FIG. 1 where a content key is re-encrypted and communicated to server for future retrieval of re-encrypted content key for decrypting content again as needed.

Secure communication system 100 supports secure transfer of content for a multiplicity or group of users. Non-limiting examples for a group of user include employees of a company, company and client and collaborative team. To perform secure transfer for a group of users, the users may have the same master key. Alternatively, the users may have the same message key.

For operation for a group of users, the master key is generated in the browser via the computing device associated with the first user. When adding a new user to the group, a user currently accessing the system may provide the initial password for the new member of the group. The initial password is used to re-encrypt the master key. The re-encrypted master key is stored along with the new user's information on the server. The initial password of the new user is hashed via the browser executing on the computing device. As a non-limiting example, the hash operation performed may be SHA256. Furthermore, the hashing operation may be performed via the browser using JavaScript. Furthermore, the hashed version of the password is stored on the server and the unencrypted version of the password is not. The new user enters a correct initial password during the activation process. Furthermore, the correctly entered password is used to fetch and decrypt the master key. The new user may change the password as needed. When changing a password, the master key is re-encrypted using the user's new password as described with reference to FIG. 5. The master key is shared by the users associated with group, but the master key is not communicated to or stored on the server.

FIGS. 12A-E illustrates an example method for the communication system as described with reference to FIGS. 1-5, in accordance with an embodiment of the present invention.

For the embodiment of FIGS. 12A-E secure communication system 100 provides capability for activation, login, content storage, content retrieval and change of password.

Figure 12A:
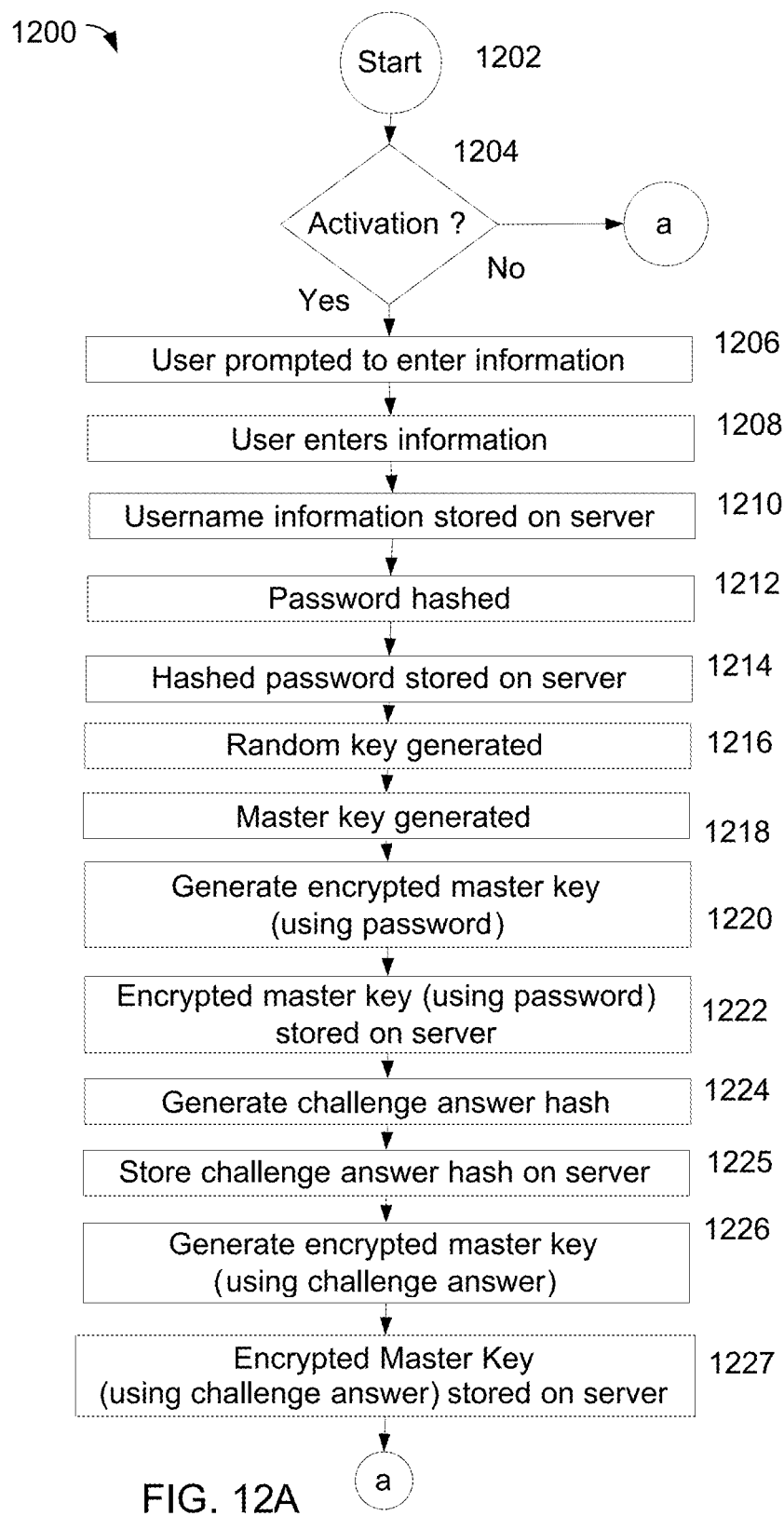
FIGS. 12A-E illustrate an example method for the communication system as described with reference to FIGS. 1-5, in accordance with an embodiment of the present invention.

Referring to FIG. 12A, a method 1200 initiates in a step 1202.

Then in a step 1204, a determination for activating for access is performed.

User interface with computing device 102 (FIG. 1) determines if secure access for information is needed.

Referring back to FIG. 12A, for a determination of performing activation in step 1204, then in a step 1206 user is prompted to enter information.

User (not shown) is requested to provide username information, password information and an answer to a challenge question via user interface portion 112 (FIG. 1). As a non-limiting example, challenge question may be "What is your mother's maiden name"?

Referring back to FIG. 12A, then in a step 1208 user enters information.

User provides username via username portion 118 (FIG. 1), password via password portion 120 (FIG. 1) and answer to challenge question via answer to challenge portion 122 (FIG. 1).

Referring back to FIG. 12A, then in a step 1210 username information is stored on server.

Username information is communicated from username portion 118 (FIG. 1) to username portion 180 for storage and is communicated via communication portion 116 (FIG. 1), global communication network 106 (FIG. 1) and communication portion 176 (FIG. 1).

Referring back to FIG. 12A, then in a step 1212 password hash encryption operation is performed.

Password information is received by hash portion 124 (FIG. 1) and a hash operation is performed to generate a hashed password. As a non-limiting example a one-way hash algorithm may be used such as SHA256. The SHA256 algorithm is a cryptographic hash function which stands for Secure Hash Algorithm and has four hash functions and has 256 bit digests. Furthermore, as a non-limiting example, hash operation may be performed by users' browser. Furthermore, as a non-limiting example, hash operation may be performed using JavaScript. JavaScript is a prototype-based scripting language that is dynamic, weakly typed, general purpose programming language and has first-class functions.

Referring back to FIG. 12A, then in a step 1214 hashed password is stored on server.

The results of the hash portion 124 (FIG. 1) are communicated to password hash portion 134 (FIG. 1). Furthermore, the hash results are then communicated to password hash portion 182 (FIG. 1) for storage via communication portion 116 (FIG. 1), global communication network 106 (FIG. 1) and communication portion 176 (FIG. 1). The unencrypted version of the password information is not communicated to server device 104 (FIG. 1).

Referring back to FIG. 12A, then in a step 1216 a random key is generated. Random key generator portion 138 (FIG. 1) generates a random key. The random key generated is used as the master key.

Random key generated by random key generator portion 138 (FIG. 1) is used as the master key for the user. As a non-limiting example, the master key is a randomly generated AES key that is greater than or equal to 128 bits. AES stands for Advanced Encryption Standard and is used for the encryption of electronic information. AES is a symmetric-key algorithm, meaning the same key is used for encrypting and decrypting information. Furthermore, as a non-limiting example, the master key may be generated in the user's browser during account activation. Furthermore, the master key may be generated via JavaScript.

Referring back to FIG. 12A, then step 1220 generates encrypted master key (using password).

Symmetric encryption portion 126 (FIG. 1) receives password information from password portion 120 (FIG. 1) and master key from master key portion 128 (FIG. 1) and encrypts the master key to form encrypted master key (using password). The password is used as a key in the encryption operation in an indirect way (as a non-limiting example, a PBKDF2 like algorithm is used to generate a key to encrypt the master key). Furthermore, encrypted master key (using password) is received by encrypted master key portion 136 (FIG. 1) associated with password. As a non-limiting example, encryption/decryption may be performed via AES.

Referring back to FIG. 12A, then in a step 1222 encrypted master key (using password) is stored on server.

Encrypted master key portion 136 (FIG. 1), associated with password, communicates encrypted master key (using password) to encrypted master key portion 184 (FIG. 1) associated with password for storage via communication portion 116 (FIG. 1), global communication network 106 and communication portion 176 (FIG. 1).

Referring back to FIG. 12A, then in step 1224 hashing of challenge answer is performed.

The answer to the challenge question is received by hash portion 132 (FIG. 1) for performing a hash operation to generate a challenge answer hash. As a non-limiting example, the hash operation performed by hash portion 132 (FIG. 1) may be SHA256. Furthermore, as a non-limiting example, hash operation may be performed by users' browser. Furthermore, as a non-limiting example, hash operation may be performed using JavaScript.

Referring back to FIG. 12A, then in step 1225 challenge answer is stored on server.

The challenge answer hash is received by hash challenge portion 142 (FIG. 1) and communicated to hash challenge portion 188 (FIG. 1) for storage via communication portion 116 (FIG. 1), global communication network 106 (FIG. 1) and communication portion 176 (FIG. 1). The clear form of the challenge answer is not communicated or stored on server device 104.

Referring back to FIG. 12A, then in a step 1226 an encrypted master key (using challenge answer) is generated.

Symmetric encryption portion 130 (FIG. 1) receives master key from master key portion 128 (FIG. 1) and answer to challenge question from challenge portion 122 (FIG. 1) and encrypts the master key using the challenge answer as the encryption key, to generate an encrypted master key (using challenge answer). The challenge answer is used as the encryption key indirectly. As a non-limiting example, a PBKDF2 like algorithm is used to create a key from the challenge answer.

Referring back to FIG. 12A, then in a step 1227 encrypted master key (using challenge answer) is stored on server.

Encrypted master key (using challenge answer) is received by encrypted master key portion 140 (FIG. 1) associated with challenge answer which communicates the encrypted master key (using challenge answer) to encrypted master key portion 186 (FIG. 1), associated with challenge answer, for storage via communication portion 116 (FIG. 1), global communication network 106 (FIG. 1) and communication portion 176 (FIG. 1).

Master key is not accessible via persons associated with server device 104 (FIG. 1) and also not associated with computing device 102 (FIG. 1), as information associated with the master key is not communicated to server device 104 (FIG. 1). The encrypted form of the master key may be decrypted using the user's original password or the user's answer to the challenge question. Furthermore, the original password information and the answer to the challenge question are not communicated to server device 104 (FIG. 1).

Figure 12B:
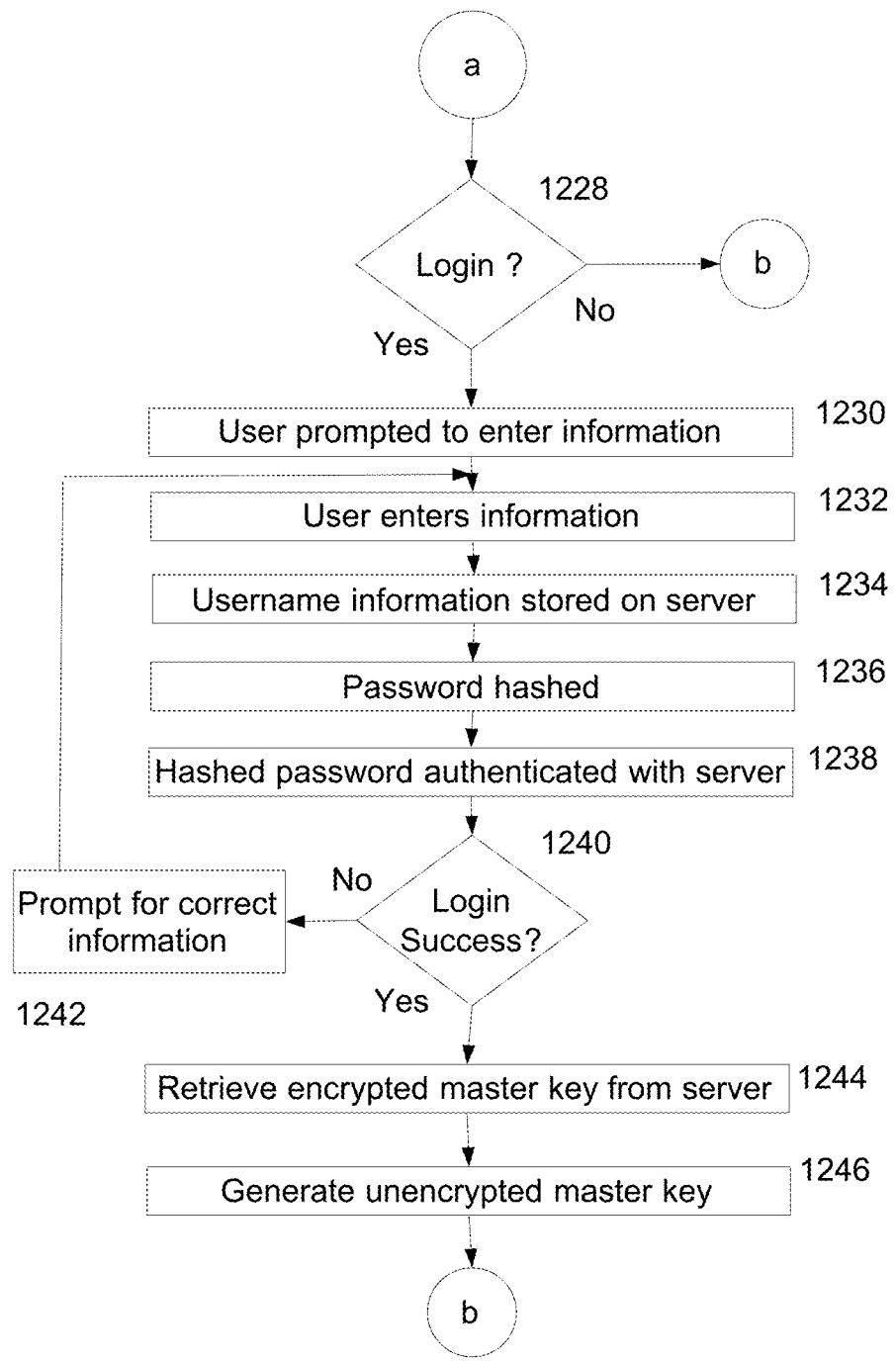

Referring to FIG. 12B, for a determination of not performing activation in step 1204 (FIG. 12A) and following execution of step 1227 (FIG. 12A), then in a step 1228 a determination for logging into an account is performed.

User selects to perform login via user interface portion 112 as described with reference to FIG. 2.

Referring back to FIG. 12B, for a determination of logging into an account in step 1228, then in a step 1230 user is prompted to enter information.

User is requested to provide username information and password information via user interface portion 112 (FIG. 2).

Referring back to FIG. 12B, then in a step 1232 user enters information.

The username information is received by username portion 118 (FIG. 2) and the password information is received by password portion 120 (FIG. 2).

Referring back to FIG. 12B, then in step 1234 username information is used for verification of user on server.

The username information is communicated from username portion 118 (FIG. 2) to username portion 180 (FIG. 2) for verification.

Referring back to FIG. 12B, then in step 1236 hashing is performed on password. The same hash encryption algorithm is used as used during user activation.

The password information is received by hash portion 124 (FIG. 2) and a hash operation is performed to generate a hashed password.

Referring back to FIG. 12B, then in a step 1238 hashed password is checked to be the same as the one stored on the server for the user.

The hashed password is received by password hash portion 134 (FIG. 2) and is communicated to password hash portion 182 (FIG. 2). The received hashed password is authenticated against the stored hashed password information for the received username.

Referring back to FIG. 12B, then a determination for login success is performed in a step 1240.

Referring to FIG. 12B, for a determination of login not successful in step 1240, then in a step 1242 user is prompted to provide correct information followed by execution of method 1200 transferring to step 1232.

Referring back to FIG. 12B, for a determination of login success in step 1240, then in step 1244 "encrypted master key (using password)" is retrieved from server.

If the username and password information are authenticated, then the encrypted version of the user's master key is retrieved from encrypted master key portion 184 (FIG. 2), associated with the password, and communicated to computing device 102 (FIG. 2). As a non-limiting example, the retrieved encrypted master key may be received by the browser executing on computing device 102 (FIG. 2).

Referring back to FIG. 12B, then in a step 1246 an unencrypted master key is generated.

The clear form of the user password is then used to retrieve the clear form of the master key using the same algorithm to decrypt as used during the encryption of the master key (using password). The password is used indirectly as the decryption key. As a non-limiting example, a PBKDF2 like algorithm is first used to generate a key from the password. The same algorithm is used to generate the key as used during the user activation. The clear form of the master key is then used for content storage and retrieval. As a non-limiting example, the clear master key may be stored in the browser executing on computing device 102 (FIG. 2).

The login operation is performed securely, as the unencrypted password is not communicated to server device 104 (FIG. 2).

Figure 12C:
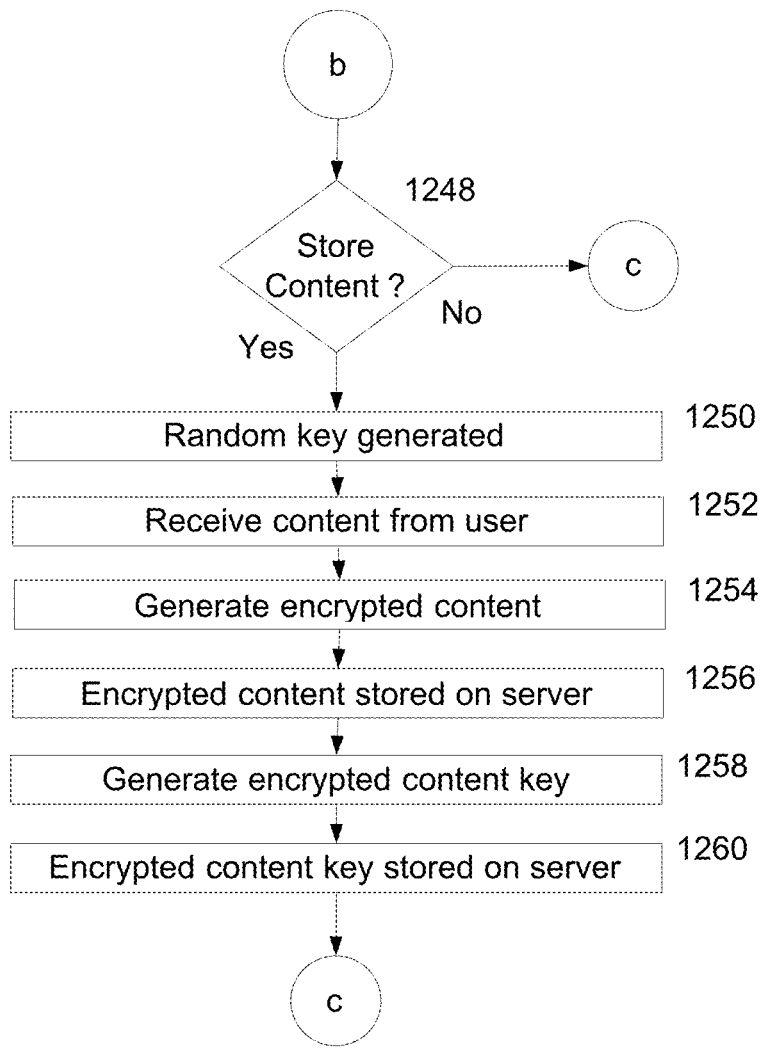

Referring to FIG. 12C, for a determination of not performing login in step 1228 (FIG. 12B) and following execution of step 1246 (FIG. 12B), then in step 1248 a determination is performed for storing content on server.

A user determines to securely store content from content portion 302 (FIG. 3) associated with computing device 102 (FIG. 3) on server device 104 (FIG. 3).

Referring back to FIG. 12C, for a determination of storing content in step 1248, then in a step 1250 a random key is generated, to be used as the content key.

Content key portion 304 (FIG. 3) receives a random key from random key generator portion 305 (FIG. 3). As a non-limiting example, content key may be generated for AES encryption.

Referring back to FIG. 12C, then in a step 1252 content is received from user.

Content information is received from user via content portion 302 (FIG. 3).

Referring back to FIG. 12C, then in a step 1254 encrypted content is generated.

Symmetric encryption portion 303 (FIG. 3) then receives content from content portion 302 (FIG. 3) and content key from content key portion 304 (FIG. 3) for generating encrypted content. The content key is used as the encryption key of the operation. As a non-limiting example, the content may be encrypted via the user's browser.

Referring back to FIG. 12C, then in step 1256 encrypted content is stored on server.

The encrypted content is received by encrypted content portion 308 and communicated to encrypted content portion 332 (FIG. 3).

Referring back to FIG. 12C, then in step 1258 encrypted content key is generated.

Symmetric encryption portion 307 (FIG. 3) receives content key from content key portion 304, receives master key from master key portion 128 (FIG. 3) and encrypts content key to form encrypted content key. The master key is used as the encryption key for the operation. As a non-limiting example, master key may be retrieved from the user's browser session storage.

Referring back to FIG. 12C, then in a step 1260 encrypted content key is stored on server.

Encrypted content key is communicated to encrypted content key portion 334 (FIG. 3).

Content communicated to server device 104 (FIG. 3) is secure, as decryption keys needed for decryption are not available outside of computing device 102 (FIG. 3). The content information is encrypted as well as the content key. The content key is encrypted via the master key. The master key is encrypted using the user password information. The clear form of the user password information is not transported or saved on server device 104 (FIG. 3).

Figure 12D:
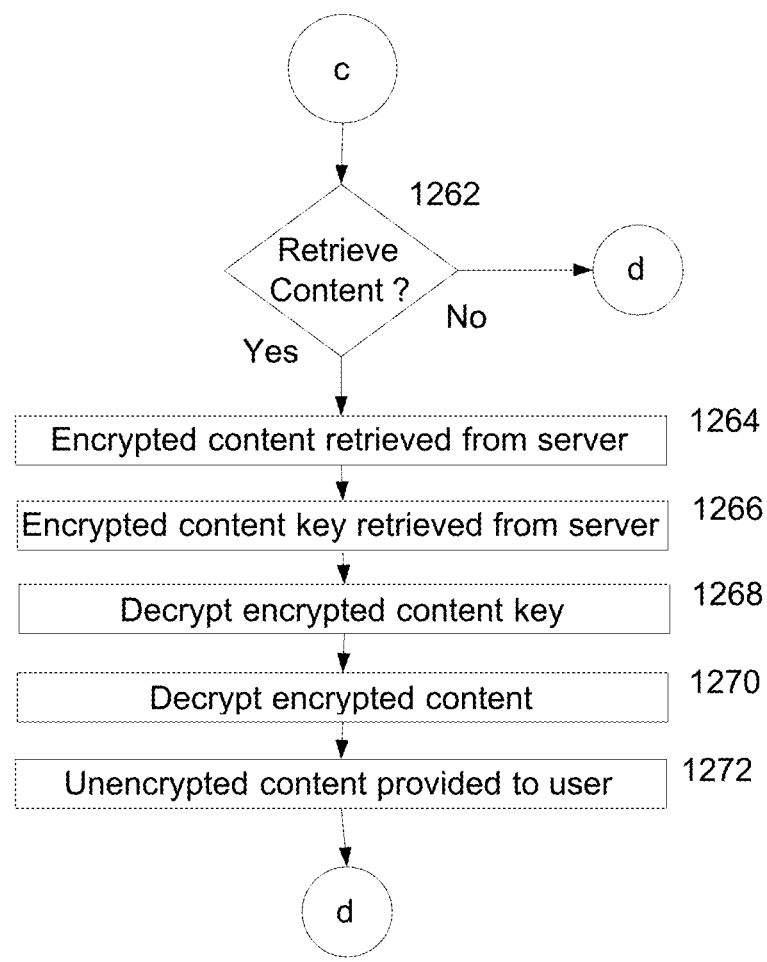

Referring to FIG. 12D, for a determination of not storing content in step 1248 (FIG. 12C) and following execution of step 1260 (FIG. 12C), a determination for retrieving content is performed in a step 1262.

User may retrieve content from server device 104 (FIG. 4) to computing device 102 (FIG. 4).

Referring back to FIG. 12D, for a determination of retrieving content in step 1262, then in a step 1264 encrypted content is retrieved from server.

Encrypted content is retrieved from encrypted content portion 332 (FIG. 4) and received by encrypted content portion 308 (FIG. 4).

Referring back to FIG. 12D, then in a step 1266 encrypted content key is retrieved from server.

Encrypted content key is retrieved from encrypted content key portion 334 (FIG. 4) and received by encrypted content key portion 310 (FIG. 4). As a non-limiting example, encrypted content and encrypted content key may be received by a browser executing on computing device 102 (FIG. 4).

Referring back to FIG. 12D, then in a step 1268 encrypted content key is decrypted.

Symmetric encryption portion 402 (FIG. 4) receives encrypted content key from encrypted content key portion 310 (FIG. 4), receives master key from master key portion 128 (FIG. 4) and performs decryption of the encrypted content key in order to generate the clear or unencrypted version of the content key. The master key is used as the decryption key in the operation. The same algorithm is used to decrypt as used to encrypt the content key during content storage. Furthermore, unencrypted version of the content key is received by content key portion 304 (FIG. 4). As a non-limiting example, the master key may be stored in the session storage associated with the browser executing on computing device 102 (FIG. 4).

Referring back to FIG. 12D, then in a step 1270 encrypted content is decrypted.

Symmetric encryption portion 401 (FIG. 4) receives encrypted content from encrypted content portion 308 (FIG. 4) and receives content key from content key portion 304 (FIG. 4) and performs decryption of the encrypted content in order to generate the unencrypted version of the content. The content key is used as the decryption key in the operation. The same algorithm is used to decrypt as used during the encryption of content during the content storage. Furthermore, the unencrypted version of the content is received by content portion 302 (FIG. 4).

Referring back to FIG. 12D, then in a step 1272 unencrypted content is provided to user.

Unencrypted content may be provided to user via user interface portion 112 (FIG. 4). Non-limiting examples of content which may be unencrypted in this manner include text, audio, image, video and documents.

Figure 12E:
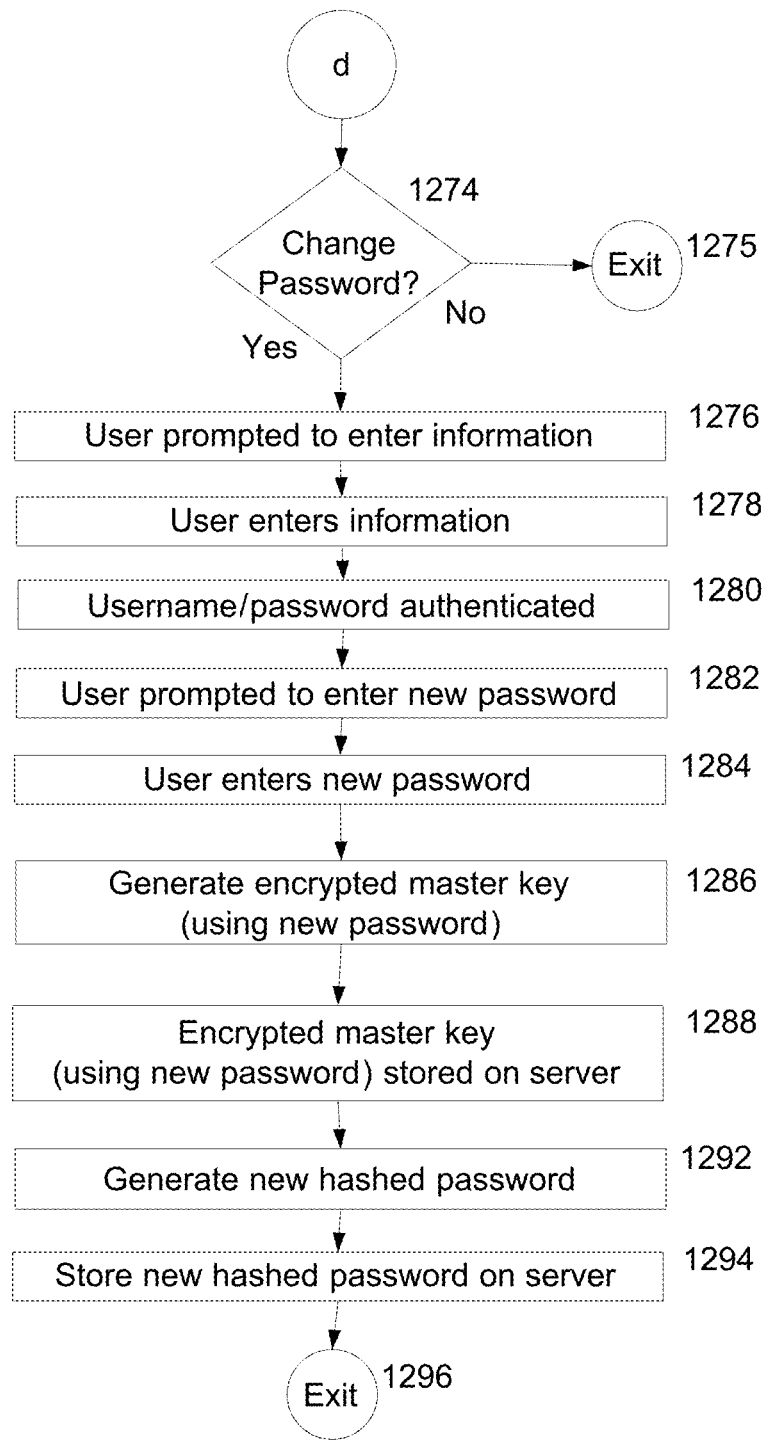

Referring to FIG. 12E, for a determination of not retrieving content in step 1262 (FIG. 12D) or following execution of step 1272 (FIG. 12D), then a determination for changing password is performed in step 1274.

User may opt to change password via user interface portion 112 (FIG. 5).

Referring back to FIG. 12E, for a determination of not changing a password in step 1274, then in step 1275 execution of method 1200 terminates.

Referring back to FIG. 12E, for a determination of changing password in step 1274, then in a step 1276 user is prompted to enter information.

User is prompted to provide username and password information via user interface portion 112 (FIG. 5).

Referring back to FIG. 12E, then in a step 1278 user enters information.

Username information is received by username portion 118 (FIG. 5) and password information is received by password portion 120 (FIG. 5).

Referring back to FIG. 12E, then in step 1280 username/password information is authenticated.

Computing device 102 (FIG. 5) authenticates the provided username/password with server device 104 (FIG. 5).

Referring back to FIG. 12E, then in step 1282 user is prompted to enter a new password.

User is prompted to enter new password information via user interface portion 112 (FIG. 5).

Referring back to FIG. 12E, then in a step 1284 user enters new password.

New password information is received by password portion 120 (FIG. 5).

Referring back to FIG. 12E, then in step 1286 new password is used to encrypt the master key. The user's master key has been fetched into the computing device 102.

Symmetric encryption portion 126 (FIG. 5) receives master key from master key portion 128 (FIG. 5), receives new password information from password portion 120 (FIG. 5) and performs an encryption operation on the master key to create a new encrypted master key (using new password). The new password is used as the encryption key indirectly. As a non-limiting example, a PBKDF2 like algorithm is used to create a symmetric key using the new password. This symmetric key is then used as the encryption key for the operation. Furthermore, the new "encrypted master key (using password)" is received by encrypted master key portion 136 (FIG. 5) associated with password. As a non-limiting example, master key may be made available by the browser executing on computing device 102 (FIG. 5).

Referring back to FIG. 12E, then in a step 1288 newly "encrypted master key (using password)" is stored on server.

The new encrypted master key (using password) is received by encrypted master key portion 184 (FIG. 5) associated with password from encrypted master key portion 136 (FIG. 5) associated with password.

Referring back to FIG. 12E, then in a step 1292 a new hashed password is generated.

Hash portion 124 (FIG. 5) receives new password and performs a hash operation to generate a hashed password. As a non-limiting example hash operation performed may be SHA256.

Referring back to FIG. 12E, then in a step 1294 new hashed password is stored on server.

Hashed password is received by password hash portion 134 and is communicated to password hash portion 182 (FIG. 5).

During the password change procedure, the master key is not communicated to server device 104 or stored on server device 104 (FIG. 5). Furthermore, during the password change, the new user password is not communicated to server device 104 (FIG. 5) or stored on server device 104 (FIG. 5).

Referring back to FIG. 12E, then in a step 1296 execution of method 1200 terminates.

Figure 13:
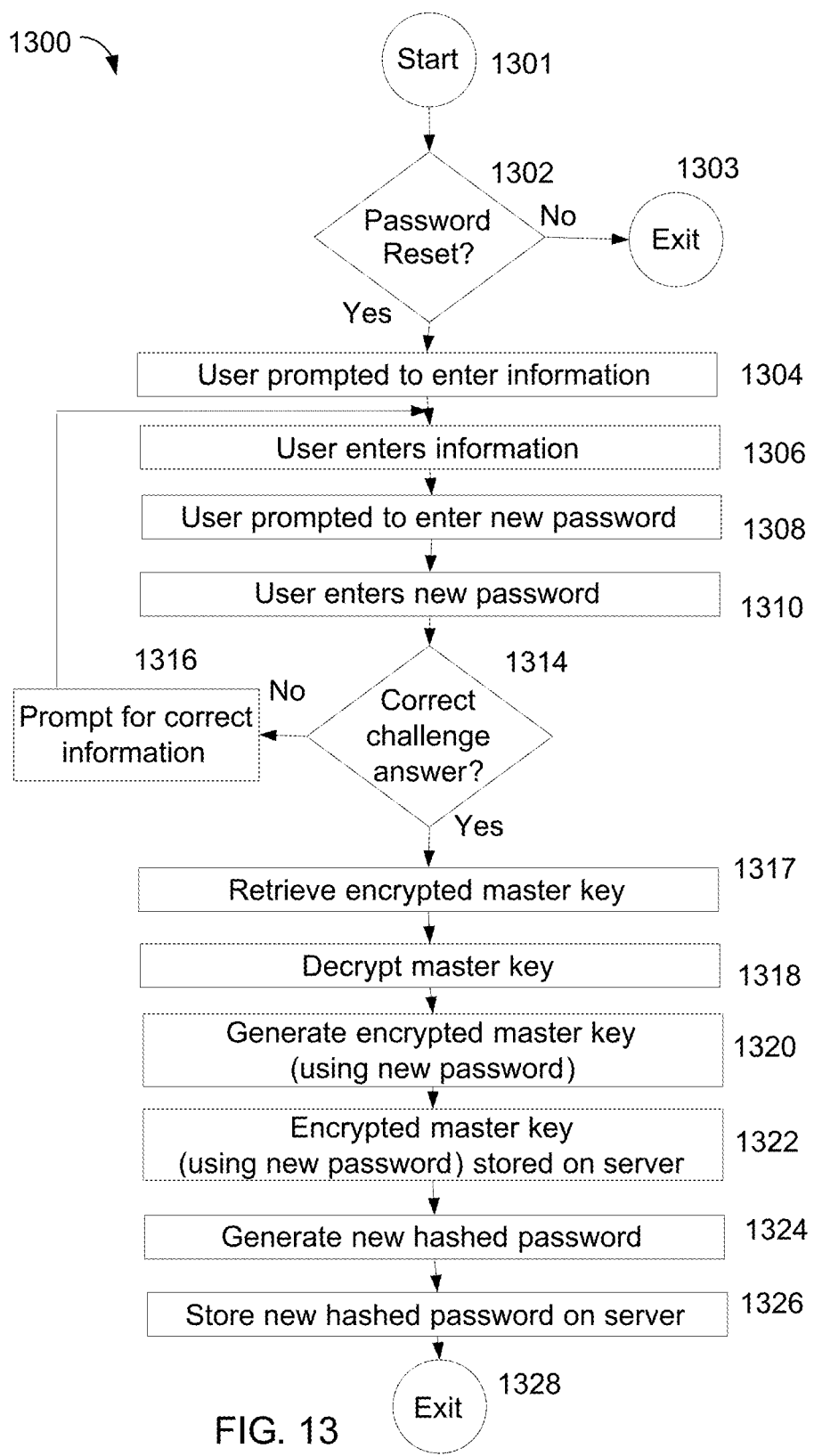
FIG. 13 illustrates an example method for the communication system as described with reference to FIGS. 6-7, in accordance with an embodiment of the present invention.

FIG. 13 illustrates an example method for the communication system as described with reference to FIGS. 6-7, in accordance with an embodiment of the present invention.

For the embodiment of FIG. 13 secure communication system 100 provides capability for performing a password reset.

Referring to FIG. 13, a method 1300 initiates in a step 1301.

Referring to FIG. 13, a determination for resetting a password is performed in a step 1302.

User may opt to reset a password by accessing via user interface portion 112 (FIG. 6).

Referring to FIG. 13, for a determination of not performing a password reset in step 1302 execution of method 1300 terminates in step 1303.

Referring to FIG. 13, for a determination of performing a password reset in step 1302, then in a step 1304 user is prompted to enter information.

User is prompted to enter username and answer to challenge security question via user interface portion 112 (FIG. 6).

Referring back to FIG. 13, then in a step 1306 user enters information.

Username portion 118 (FIG. 6) receives username information. Challenge portion 122 (FIG. 6) receives answer to challenge security question.

Referring back to FIG. 13, then in a step 1308 user is prompted to enter a new password.

User is prompted to enter new password information via user interface portion 112 (FIG. 6).

Referring back to FIG. 13, then in a step 1310 user enters new password.

Password portion 120 (FIG. 6) receives new password information.

The user is authenticated using the answer to the challenge question.

The answer to the challenge question is hash encrypted using the same algorithm as used during user activation. The hashed answer is communicated to the server and is compared with the hashed answer stored on the server for the user. If they match, the encrypted master key (using challenge answer) is retrieved from server and is communicated to the computing device 102. If the hashed challenge answer does not match the value stored on the server, the user is prompted to re-enter the correct value.

Referring back to FIG. 13, for a determination of user not entering correct answer to challenge question in step 1314, then in a step 1316, user is prompted to enter correct answer to challenge question followed by execution of method 1300 transitioning to step 1306.

User is prompted to enter correct answer to challenge question via user interface portion 112 (FIG. 6).

Referring back to FIG. 13, for a determination of user entering correct answer to challenge question in step 1314, then in a step 1317 master key is retrieved from server and is communicated to computing device 102.

If the user is authenticated successfully, then in a step 1318 the master key is decrypted on the computing device 102.

Symmetric encryption portion 130 (FIG. 6) receives the encrypted master key, receives the answer to the challenge question from challenge portion 122 (FIG. 6) and performs decryption of the encrypted master key in order to generate the master key. The answer to the challenge question is used as the decryption key in an indirect way. The same algorithm is used to decrypt as used to encrypt the master key during user activation. As a non-limiting example, a PBKDF2 like algorithm is used to create a key to the symmetric encryption operation from the answer to the challenge question. The same algorithm is used to generate the key as used during the activation process.

Referring back to FIG. 13, then in a step 1320 the master key is re-encrypted using the new password.

Symmetric encryption portion 126 (FIG. 6) receives master key from master key portion 128 (FIG. 6), receives new password from password portion 120 (FIG. 6) and performs encryption of the master key for generating a new encrypted master key (using new password). The new password is used as the encryption key to the operation in an indirect way. A PBKDF2 like algorithm is used to generate a key from the new password. The new encrypted master key is received by encrypted master key portion 136 (FIG. 6).

Referring back to FIG. 13, then in a step 1322 new encrypted master key (using password) is stored on server.

Encrypted master key portion 184 (FIG. 6) associated with password receives new encrypted master key (using password) from encrypted master key portion 136 (FIG. 6) associated with password and replaces old encrypted master key (using password) with new encrypted master key (using password).

Referring back to FIG. 13, then in a step 1324 a new hashed password is generated.

Hash portion 124 (FIG. 6) receives the new password from password portion 120 (FIG. 6) performs a hash operation in order to generate a new hashed password. As a non-limiting example, the hash operation may be performed via SHA256. Password hash portion 134 (FIG. 6) receives hashed password from hash portion 124 (FIG. 6).

Referring back to FIG. 13, then in a step 1326 new hashed password is stored on server.

Password hash portion 182 (FIG. 6) receives new hashed password from password hash portion 134 (FIG. 6) and replaces old hashed password with new hashed password.

During the process of resetting the password, the unencrypted master key and the unencrypted answer to the challenge security question and the unencrypted new user password are not communicated to or stored on server device 104 (FIG. 6).

Referring back to FIG. 13, then in a step 1328 execution of method 1300 terminates.

Figure 14:
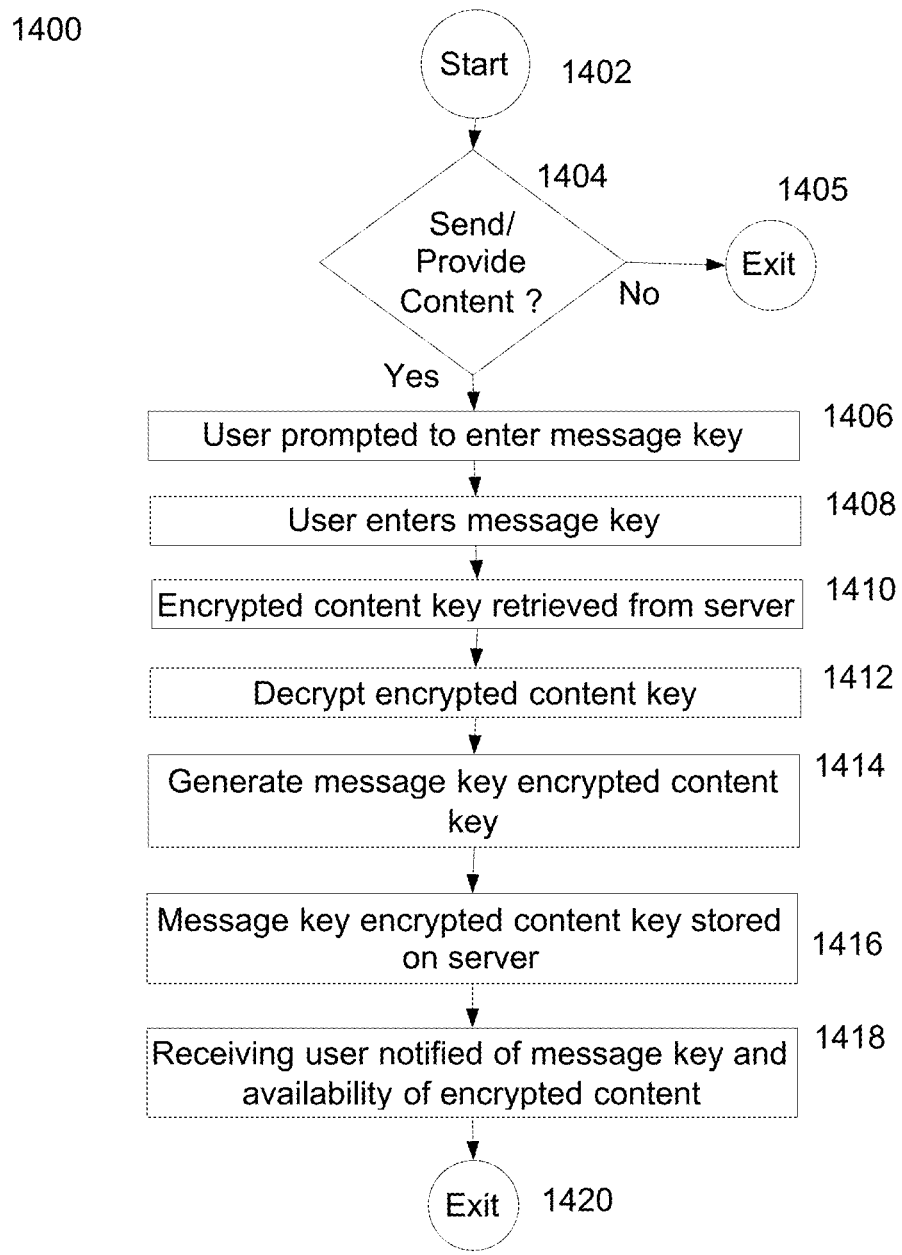
FIG. 14 illustrates an example method for the communication system as described with reference to FIGS. 6-7, in accordance with an embodiment of the present invention.

FIG. 14 illustrates an example method for the communication system as described with reference to FIGS. 6-7, in accordance with an embodiment of the present invention.

For the embodiment of FIG. 14 secure communication system 100 provides capability for transmitting and providing content.

Referring to FIG. 14, a method 1400 initiates in a step 1402.

Referring to FIG. 14, in a step 1404 a determination for user sending/providing content to a guest user is performed.

Referring to FIG. 14, for a determination of user not sending/providing content in step 1404, then in a step 1405 execution of method 1400 terminates.

Referring to FIG. 14, for a determination of user sending/providing content in step 1404, then in a step 1406 user is prompted to enter message key.

User is prompted to enter a message key via user interface portion 112 (FIG. 7). A message key is similar to a password and provides secure access to encrypted content to a receiving user.

Referring back to FIG. 14, then in a step 1408 user enters message key.

Message key portion 702 (FIG. 7), associated with a password specific to the content being transmitted, receives message key from user. A message key is the password that would be shared with the guest user receiving the content.

Referring back to FIG. 14, then in a step 1410 encrypted content key for the content that is being sent/provided to guest user is retrieved from server.

Encrypted content key is received by encrypted content key portion 310 (FIG. 7) from encrypted content key portion 334 (FIG. 7).

Referring back to FIG. 14, then in a step 1412 encrypted content key is decrypted.

Symmetric encryption portion 707 (FIG. 7) receives encrypted content key from encrypted content key portion 310, receives master key from master key portion 128 (FIG. 7) and performs decryption of the encrypted content key to generate the unencrypted content key. The master key is used as the key in the decryption operation. The same algorithm is used to decrypt as used during the content storage operation. Furthermore, the unencrypted content key is received by content key portion 304 (FIG. 7).

Referring back to FIG. 14, then in a step 1414 message key encrypted content key is generated.

Symmetric encryption portion 705 (FIG. 7) receives content key from content key portion 304 (FIG. 7), receives message key from message key portion 702 (FIG. 7) and performs encryption of content key using message key (as the key to the encryption operation) to generate a message key encrypted content key. The message key is used indirectly as the key to the operation. As a non-limiting example, a PBKDF2 like algorithm is used to create a key to the symmetric encryption algorithm using the message key. Message key encrypted content key is received by message key encrypted content key portion 704 (FIG. 7) from symmetric encryption portion 705 (FIG. 7).

Referring back to FIG. 14, then in a step 1416 message key encrypted content key is stored on server.

Message key encrypted content key portion 724 (FIG. 7) receives message key encrypted content key from message key encrypted content key portion 704 (FIG. 7).

Referring back to FIG. 14, then in a step 1418 receiving user notified of message key and availability of encrypted content.

The in a step 1420 execution of method 1400 terminates.

Unencrypted message key is not communicated to or stored on server device 104 (FIG. 7). Receiving guest user via receiving user computing device is notified of content available for delivery and the message key (using a different communication medium from the one used to notify guest user of content availability). As a non-limiting example, the message key may be a password that is used to perform the content exchange and is known to the user and the guest user.

Figure 15:
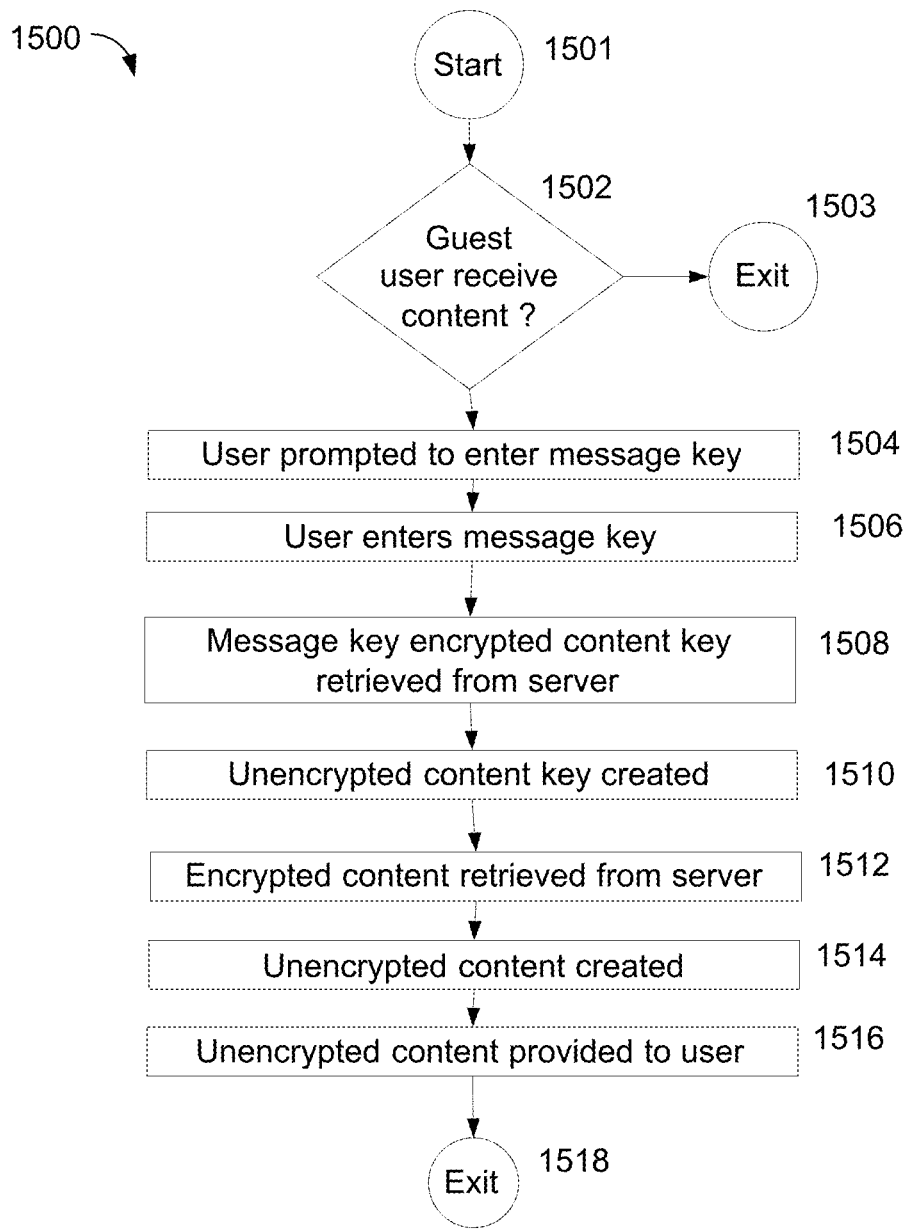
FIG. 15 illustrates an example method for the communication system as described with reference to FIG. 8, in accordance with an embodiment of the present invention.

FIG. 15 illustrates an example method for the communication system as described with reference to FIG. 8, in accordance with an embodiment of the present invention.

For the embodiment of FIG. 15 secure communication system 100 provides delivery of content to a user configured as a guest.

Referring to FIG. 15, a method 1500 initiates in a step 1502.

Referring to FIG. 15, then in a step 1504 user is prompted to enter message key.

Receiving user is prompted via user interface portion 112 (FIG. 8) of computing device 801 (FIG. 8) to enter message key which has been provided by user.

Referring back to FIG. 15, then in a step 1506 user enters message key.

Message key is received by message key portion 702 (FIG. 8) from receiving user.

Referring back to FIG. 15, then in a step 1508 message key encrypted content key retrieved from server.

Message key encrypted content key portion 704 (FIG. 8) receives message key encrypted content key from message key encrypted content key portion 724 (FIG. 8) via communication portion 176 (FIG. 8), global communication network 106 and communication portion 116 (FIG. 8).

Referring back to FIG. 15, then in a step 1510 encrypted content key is decrypted.

Symmetric encryption portion 804 (FIG. 8) receives message key from message key portion 702 (FIG. 8), associated with password for content sharing, receives message key encrypted content key from message key encrypted content key portion 704 (FIG. 8) and performs decryption of the encrypted content key to generate content key. The message is used indirectly as the key of the decryption operation. The same algorithm is used to decrypt as used during the encryption of the content key during the send operation. As a non-limiting example, a PBKDF2 like algorithm is used to generate a key to the symmetric encryption algorithm. The same algorithm and parameters are used to generate this key, as used during the encryption of the content key using the message key in the send operation. Unencrypted content key is received by content key portion 304. As a non-limiting example, decryption of content key may be performed by browser executing on computing device 801 (FIG. 8). Furthermore, decryption may be performed using JavaScript.

Referring back to FIG. 15, then in a step 1512 encrypted content is retrieved from server.

Encrypted content is received by encrypted content portion 806 (FIG. 8) from encrypted content portion 332 (FIG. 8).

Referring back to FIG. 15, then in a step 1514 unencrypted content is created.

Symmetric encryption portion 805 (FIG. 8) receives encrypted content from encrypted content portion 806 (FIG. 8), receives content key from content key portion 304 and performs decryption of the encrypted content in order to generate unencrypted content. The content key is used as the key to the decryption operation. The same algorithm is used to decrypt as used to encrypt the content during the content storage operation.

Referring back to FIG. 15, then in a step 1516 unencrypted content is provided to user.

Content portion 803 (FIG. 8) receives unencrypted content from symmetric encryption portion 805 (FIG. 8) and user may access content via user interface portion 112 (FIG. 8). If the message key is entered incorrectly by the receiving guest user, the decrypted content key is incorrect; unencrypted content is also incorrect.

Figure 16:
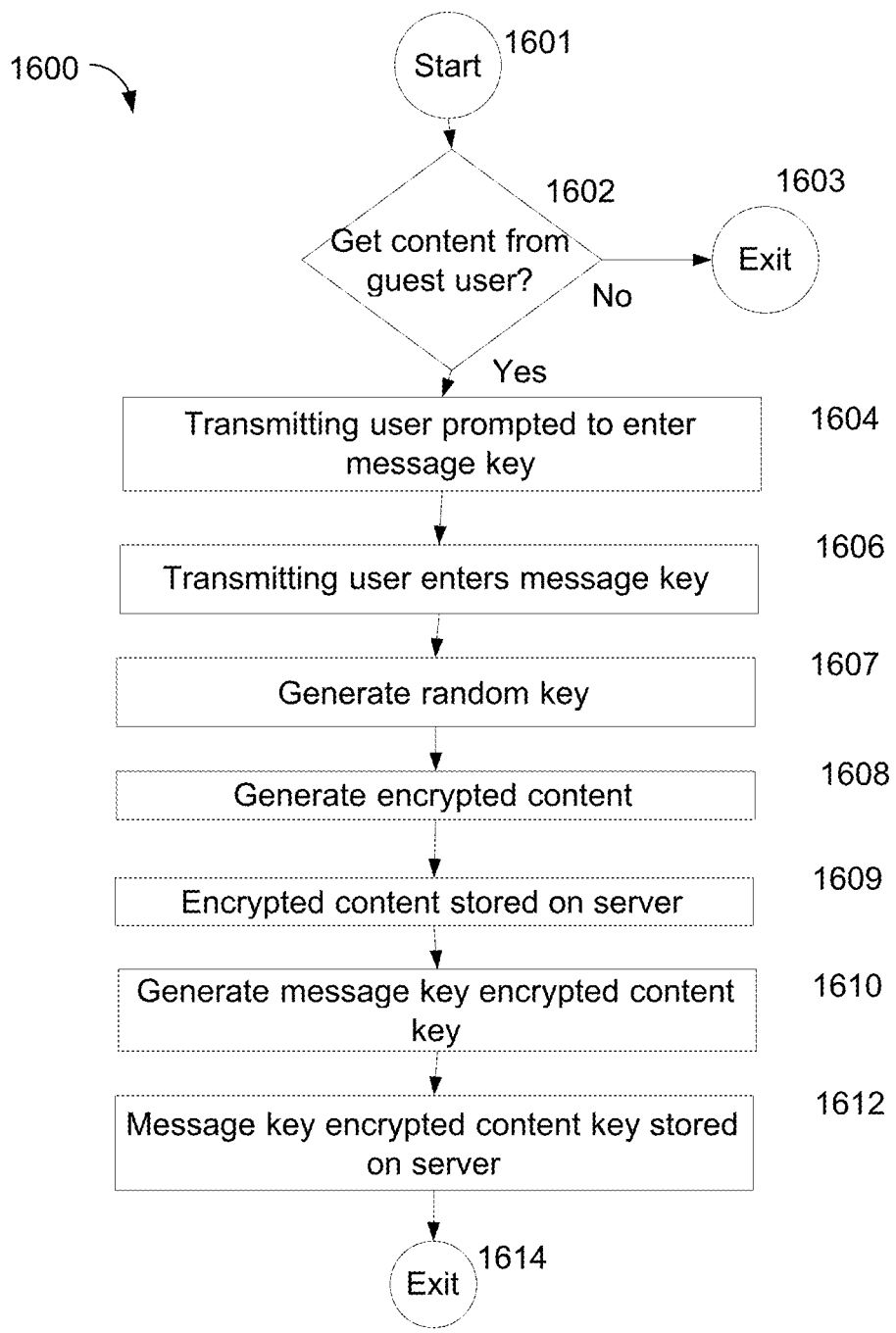
FIG. 16 illustrates an example method for the communication system as described with reference to FIG. 9, in accordance with an embodiment of the present invention.

FIG. 16 illustrates an example method for the communication system as described with reference to FIG. 9, in accordance with an embodiment of the present invention.

For the embodiment of FIG. 16 secure communication system 100 provides capability for getting content from guest user.

Referring to FIG. 16, a method 1600 initiates in a step 1601.

Referring to FIG. 16, then a determination for performing getting of content from a transmitting guest user to user with account is performed in a step 1602.

Referring to FIG. 16, for a determination of not getting content from transmitting guest user to user in step 1602, then in a step 1603 execution of method 1600 terminates.

Referring to FIG. 16, for a determination of getting content from transmitting guest user to user in step 1602, then in step 1604 transmitting user is prompted to enter message key.

Transmitting user is prompted to enter a message key and content via user interface portion 112 (FIG. 9) of computing device 901 (FIG. 9).

Referring back to FIG. 16, then in a step 1606 transmitting user enters message key. As a non limiting example, message key could be a password specific to the content.

Message key is received by message key portion 702 (FIG. 9) associated with password.

Referring back to FIG. 16, then in a step 1607 a random key is generated.

Content key portion 304 (FIG. 9) receives a new random key from random key generator portion 904 (FIG. 9). New key is received by content key portion 304 (FIG. 9). As a non-limiting example, content key is generated for AES encryption. Furthermore, as a non-limiting example, generation of content key may be performed via browser executing on computing device 901 (FIG. 9).

Referring back to FIG. 16, then in a step 1608 encrypted content is generated.

Symmetric encryption portion 903 (FIG. 9) receives content key from content key portion 304 (FIG. 9), receives content from content portion 803 (FIG. 9) and performs encryption of the content to generate encrypted content. Content key is used as the encryption key for the operation. Encrypted content is received by encrypted content portion 806 (FIG. 9).

Referring back to FIG. 16, then in a step 1609 encrypted content is stored on server.

Encrypted content portion 332 (FIG. 9) receives encrypted content from encrypted content portion 806 (FIG. 9).

Referring back to FIG. 16, then in a step 1610 message key encrypted content key is generated.

Symmetric encryption portion 902 (FIG. 9) receives message key from message key portion 702 (FIG. 9), receives content key from content key portion 304 (FIG. 9) and performs encryption of the content key to generate a message key encrypted content key. The Message Key is used as the encryption key for the operation indirectly. As a non-limiting example, a PBKDF2 like algorithm would generate a key for the symmetric encryption algorithm using the message key. Message key encrypted content key is received by message key encrypted content key portion 704 (FIG. 9).

Referring back to FIG. 16, then in a step 1612 message key encrypted content key is stored on server.

Message key encrypted content key portion 724 (FIG. 9) receives message key encrypted content key from message key encrypted content key portion 704 (FIG. 9) via communication portion 116 (FIG. 9), global communication network 106 (FIG. 9) and communication portion 176 (FIG. 9).

Unencrypted message key is not communicated to or stored by server device 104 (FIG. 9). User with account is notified of available content from transmitting guest user.

Referring back to FIG. 16, then in a step 1614 execution of method 1600 terminates.

FIG. 16 illustrates an example method for the communication system as described with reference to FIG. 9 where content is retrieved.

Figure 17:
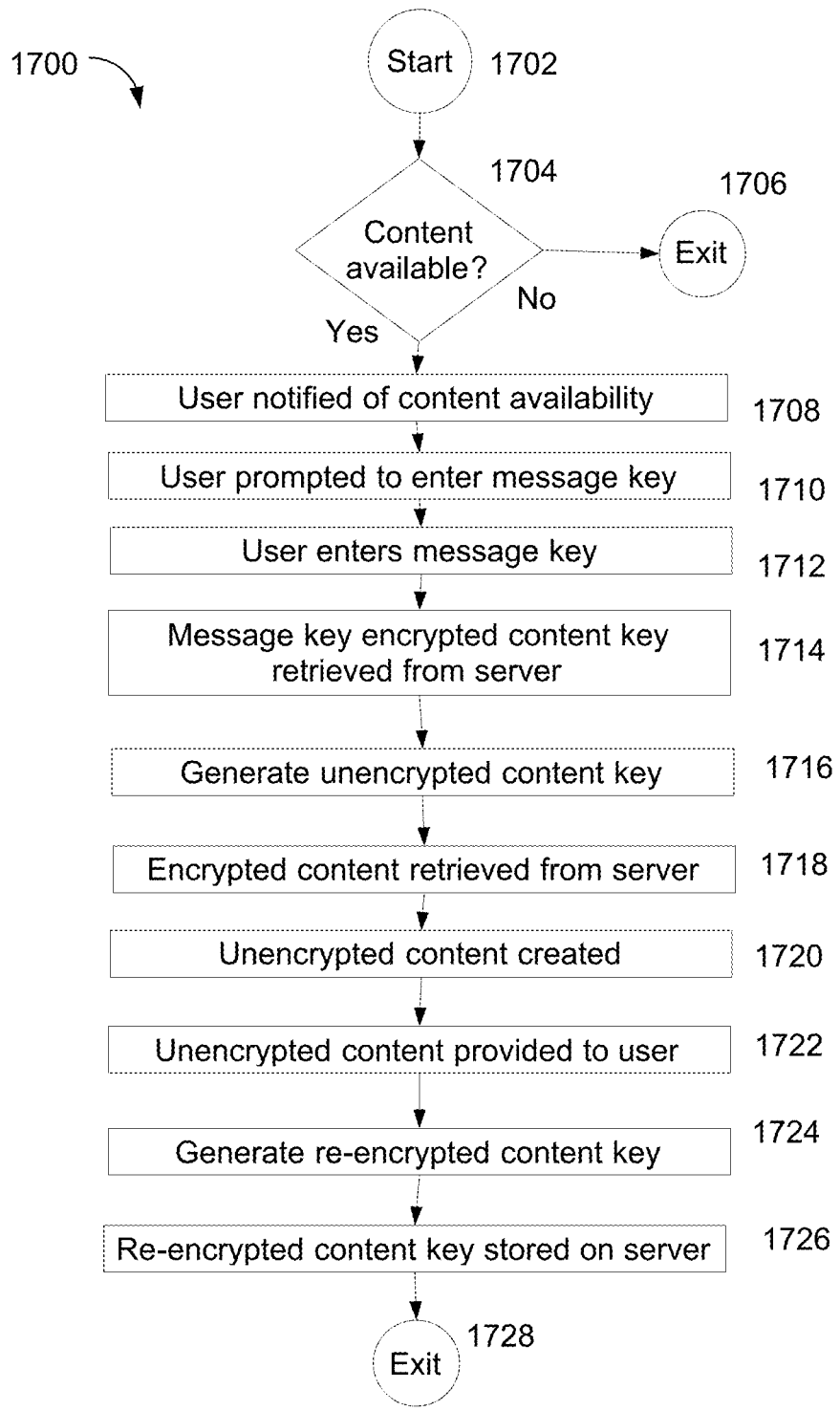
FIG. 17 illustrates an example method for the communication system as described with reference to FIGS. 10-11, in accordance with an embodiment of the present invention.

FIG. 17 illustrates an example method for the communication system as described with reference to FIGS. 10-11, in accordance with an embodiment of the present invention.

For the embodiment of FIG. 17 secure communication system 100 provides capability for providing unencrypted content (sent by guest user) to user.

Referring to FIG. 17, a method 1700 initiates in a step 1702.

Referring to FIG. 17, a determination for content (sent by guest user) available to user is performed in a step 1704.

Referring to FIG. 17, for a determination of content not available in step 1704 execution of method 1700 terminates in a step 1706.

Referring back to FIG. 17, for a determination of content available in step 1704, then in a step 1708 user is notified of the availability of content.

User is notified of availability of content. As a non-limiting example, user is notified via a browser executing on computing device 102 (FIG. 10). Message key is made available to the regular user by the transmitting guest user.

Referring back to FIG. 17, then in a step 1710 user is prompted to enter message key.

User is prompted via user interface portion 112 (FIG. 10) to enter message key which has been provided by transmitting guest user to user.

Referring back to FIG. 17, then in a step 1712 user enters message key.

Message key is received by message key portion 702 (FIG. 10) from receiving user.

Referring back to FIG. 17, then in a step 1714 message key encrypted content key is retrieved from server.

Message key encrypted content key portion 704 (FIG. 10) receives message key encrypted content key from message key encrypted content key portion 724 (FIG. 10) via communication portion 176 (FIG. 10), global communication network 106 (FIG. 10) and communication portion 116 (FIG. 10).

Referring back to FIG. 17, then in a step 1716 encrypted content key is decrypted.

Symmetric encryption portion 1004 (FIG. 10) receives message key from message key portion 702 (FIG. 10), receives message key encrypted content key from message key encrypted content key portion 704 (FIG. 10) and performs decryption of content key to generate unencrypted content key. Message key is used indirectly as the key for the decryption operation. The same algorithm is used to decrypt as used to encrypt the content key during the 'get content from guest user' operation. As a non-limiting example, PBKDF2 like algorithm is used to generate a key for the symmetric encryption algorithm using the message key. The key generation algorithm and parameters are the same as used during the encryption of the content key from the message key during the 'get content from guest user' operation (FIG. 16). Unencrypted content key is received by content key portion 304 (FIG. 10). As a non-limiting example, decryption of content key may be performed by browser executing on computing device 102 (FIG. 10). Furthermore, decryption may be performed using JavaScript.

Referring back to FIG. 17, then in a step 1718 encrypted content is retrieved from server.

Encrypted content is received by encrypted content portion 1006 (FIG. 10) from encrypted content portion 332 (FIG. 10).

Referring back to FIG. 17, then in a step 1720 unencrypted content is created.

Symmetric encryption portion 1005 (FIG. 10) receives encrypted content from encrypted content portion 1006 (FIG. 10), receives content key from content key portion 304 (FIG. 10) and performs decryption of the encrypted content in order to generate unencrypted content. Content key is used as the key for the decryption operation. The same algorithm is used to decrypt as used to encrypt content during the 'get content from guest user' operation. Content portion 1003 (FIG. 10) receives unencrypted content from symmetric encryption portion 1005 (FIG. 10).

Referring back to FIG. 17, then in a step 1722 unencrypted content is provided to user.

Unencrypted content is provided to user via user interface portion 112 (FIG. 10). If the message key is entered incorrectly by the user, the decrypted content key is incorrect; unencrypted content is also incorrect. Non-limiting examples of content include text, image, video, electronic documents and file.

Referring back to FIG. 17, then in a step 1724 a re-encrypted content key is generated.

Symmetric encryption portion 1101 (FIG. 11) receives content key from content key portion 304 (FIG. 11), receives master key from master key portion 128 (FIG. 11) and performs encryption of the content key to generate a re-encrypted version of the content key. The master key is used as the key for the encryption operation. Encrypted content key portion 310 (FIG. 11) receives the re-encrypted content key from symmetric encryption portion 1101 (FIG. 11).

Referring back to FIG. 17, then in a step 1726 re-encrypted content key is stored on server.

Encrypted content key portion 1108 receives re-encrypted content key from encrypted content key portion 310 (FIG. 11).

Referring back to FIG. 17, then in a step 1728 execution of method 1300 terminates.

FIG. 17 illustrates an example method for the communication system as described with reference to FIGS. 10-11 where unencrypted content is provided to user.

FIGS. 12-17 illustrate example methods for the communication system as described with reference to FIGS. 1-11 where activation for secure access is performed, access is securely granted, content is securely stored, content is securely retrieved, password is securely changed, password is securely reset, content is received by a receiving user, content is transmitted by a transmitting user and content is received by user from transmitting user. Unencrypted content is not stored on the server. Also, unencrypted content is not made accessible to administrative users of the server.

Figure 18:
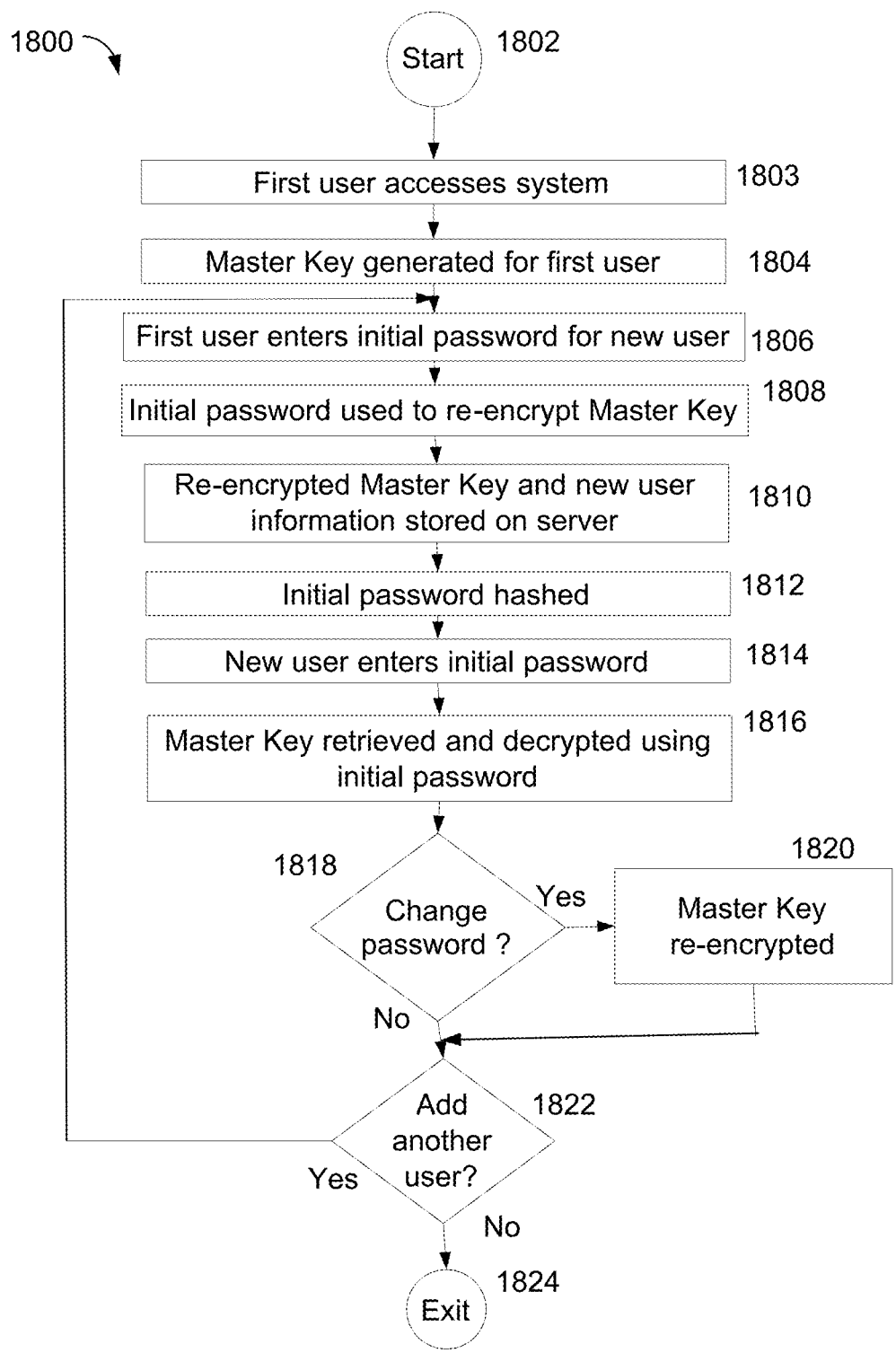
FIG. 18 illustrates an example method for shared content within a group of users for the communication system as described with reference to FIGS. 1-11, in accordance with an embodiment of the present invention.

FIG. 18 illustrates an example method for shared content within a group of users for the communication system as described with reference to FIGS. 1-11, in accordance with an embodiment of the present invention.

For the embodiment of FIG. 18 secure communication system 100 provides capability for sharing content associated with a group of user.

Referring to FIG. 18, a method 1800 initiates in a step 1802.

In a step 1803, a first user accesses the system. As a non-limiting example, the first user may be an administrator for the account.

In a step 1804, the Master Key is generated in the client application for the first user in the group.

In a step 1806, the first user enters an initial password for a new user.

In a step 1808, the initial password for the new user is used to re-encrypt the Master Key in the client application.

In a step 1810, the re-encrypted Master Key and the new user's information is stored on the server.

In a step 1812, the initial password of the new user is hashed using the hash algorithm in the client application. The hashed value of the initial password is transported to and stored on the server.

In a step 1814, the new user enters the correct initial password during the activation process and prior to gaining access to the system.

In a step 1816, the password entered by the new user is used to retrieve and decrypt the Master Key in the client application.

In a step 1818, a determination is performed for new user changing password.

For a determination of performing a password change in step 1818, in a step 1820, the Master Key is re-encrypted using the user's new password as described previously.

In a step 1822, a determination is performed for adding additional users.

For a determination in step 1822 for adding additional users, execution of method 1800 transitions to step 1806.

For a determination in step 1822 for not adding additional user, execution of method 1800 terminates in a step 1824.

FIG. 18 illustrates an example method for shared content within a group of users for the communication system as described with reference to FIGS. 1-11 where a first user accesses system, a Master Key is generated for the first user, first user enters initial password for new user, initial password is used to re-encrypt Master Key, re-encrypted Master Key and new user information is stored on server, initial password is hashed, new user enters initial password, Master Key is retrieved and decrypted using initial password, new user may opt to change to a new password and a multiplicity of new user may be added to a group. Content may be shared within a group of users. Non-limiting examples for groups of users include employees of a company, company-to-company, company-to-client and collaborative team. The users of the group have the same Master Key. Furthermore, the Master Key is shared within the group. The Master Key is not transported to or stored on the web server.

A secure communication system has been described which provides means and method for allowing users to securely store and exchange electronic information on a server such that persons associated with providing/maintaining server or otherwise not privileged with access to information stored on the server may not access unencrypted content stored on server.

The SHA256 encryption algorithm has been noted for performing encryption in the foregoing, however any known encryption algorithm may be used for performing encryption. As an example, in some alternative embodiments, multiple stages of encryption may be performed. Additionally, the encryption noted in the foregoing illustrated using a password and challenge question/answer for performing the encryption, however, other variations may be used for performing the encryption such as multiple challenge question/answer items. Also, the challenge question/answer mechanism in the foregoing is noted for resetting the password, however, other mechanisms may be used for resetting a password. Additionally, one master key has been presented for encrypting content, however, in some alternative embodiments multiple master keys may be used for performing encryption. Also, encryption has be noted as being performed via software, however, in some embodiments the encryption process may be performed via hardware. Additionally, a one pass algorithm has been noted for performing the hash operation for the user's password, however, a multiple pass hash algorithm may be used.

In some embodiments, the browser function executing on the computing devices may be performed via an application (e.g. smartphone or tablet) Furthermore, communication between client and server may use Secure Socket Layer (SSL)/Transport Layer Security (TLS) for secure communication, however, any known secure communication mechanism may be used.

As a non-limiting example, in some embodiments the secure exchange of information includes email and text messaging. Furthermore, non-limiting examples of information exchanged include text, media, Short Message Service (SMS), voice, audio, video and documents. Additionally, any known application using secure communication mechanisms may use the encryption means and method illustrated in the foregoing. Non-limiting examples for uses include desktop, web, mobile and tablet. Furthermore, in some alternative embodiments, the secure exchange information may include credit card information and information for gaining access to facilities (e.g. building). As non-limiting examples, in some alternative embodiments, the password information may be substituted for retinal scan information, fingerprint information and Deoxyribonucleic acid (DNA) information. Non-limiting examples for users of the secure information exchange include web-service providers, web application developers, file sharing services, document management system, accountants, lawyers and businesses.

In an alternative embodiment, the username/password information provided is not used for gaining access to a multiplicity of websites/web-servers.

In an alternative embodiment, authentication is not performed via download to a verifier over a predetermined period of time.

In an alternative embodiment, a search of a repository of information returning a list of documents for viewing for which the user has been granted permissions associated with user credentials is not performed.

In yet another embodiment, the master key may be used to encrypt content, instead of using the content key as the intermediate key.

In yet another embodiment, the clear form of the password may be used as the master key (no key generation. PBKDF2 like algorithm is used to convert the password to the master key itself).

Figure 19:
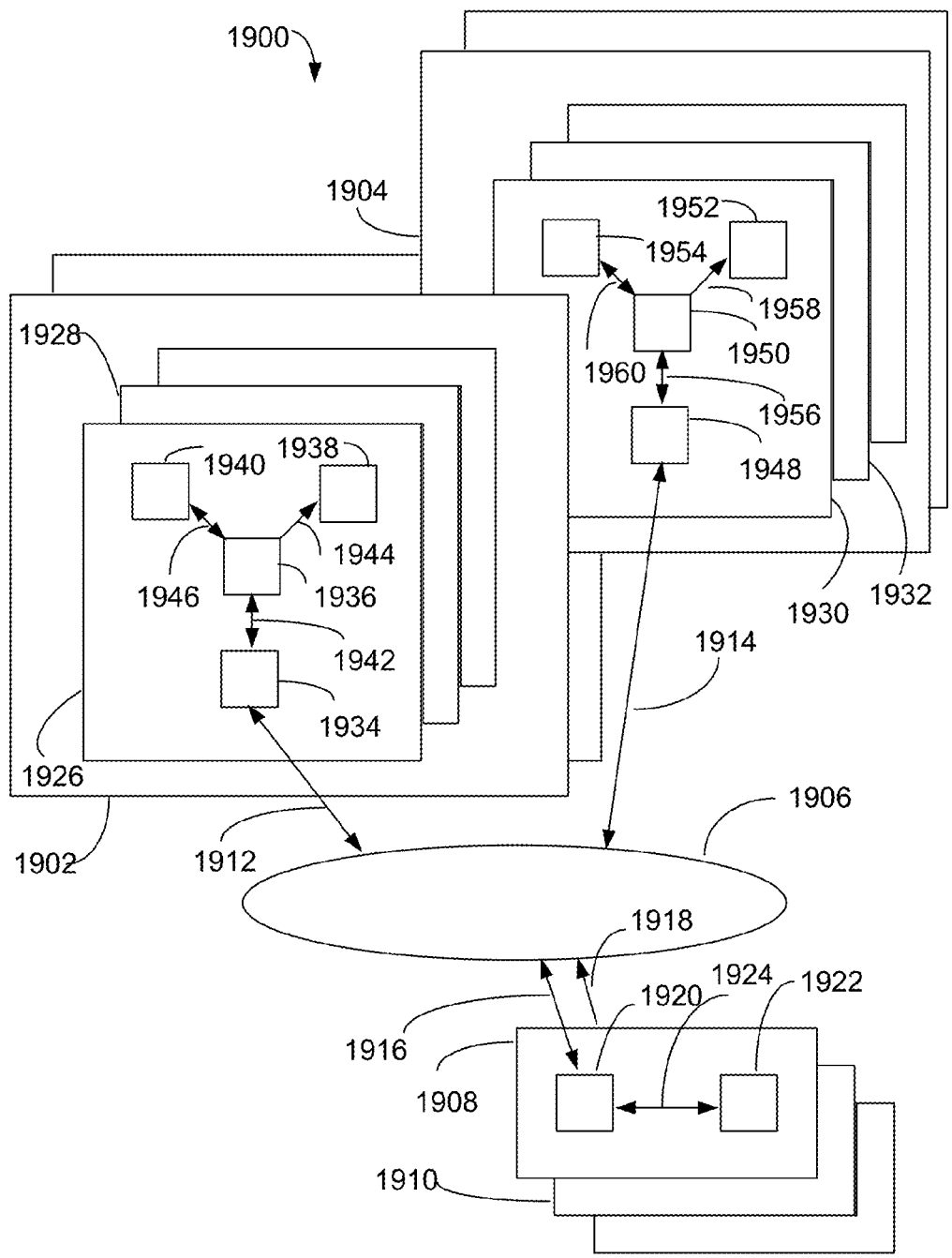
FIG. 19 illustrates a block diagram depicting a conventional client/server communication system.

FIG. 19 illustrates a block diagram depicting a conventional client/server communication system.

A communication system 1900 includes a multiplicity of networked regions with a sampling of regions denoted as a network region 1902 and a network region 1904, a global network 1906 and a multiplicity of servers with a sampling of servers denoted as a server device 1908 and a server device 1910.

Network region 1902 and network region 1904 may operate to represent a network contained within a geographical area or region. Non-limiting examples of representations for the geographical areas for the networked regions may include postal zip codes, telephone area codes, states, counties, cities and countries. Elements within network region 1902 and 1904 may operate to communicate with external elements within other networked regions or within elements contained within the same network region.

In some implementations, global network 1906 may operate as the Internet. It will be understood by those skilled in the art that communication system 1900 may take many different forms. Non-limiting examples of forms for communication system 1900 include local area networks (LANs), wide area networks (WANs), wired telephone networks, cellular telephone networks or any other network supporting data communication between respective entities via hardwired or wireless communication networks. Global network 1906 may operate to transfer information between the various networked elements.

Server device 1908 and server device 1910 may operate to execute software instructions, store information, support database operations and communicate with other networked elements. Non-limiting examples of software and scripting languages which may be executed on server device 1908 and server device 1910 include C, C++, C# and Java.

Network region 1902 may operate to communicate bi-directionally with global network 1906 via a communication channel 1912. Network region 1904 may operate to communicate bi-directionally with global network 1906 via a communication channel 1914. Server device 1908 may operate to communicate bi-directionally with global network 1906 via a communication channel 1916. Server device 1910 may operate to communicate bi-directionally with global network 1906 via a communication channel 1918. Network region 1902 and 1904, global network 1906 and server devices 1908 and 1910 may operate to communicate bi-directionally and also communicate bi-directionally with other networked device located within communication system 1900.

Server device 1908 includes a networking device 1920 and a server 1922. Networking device 1920 may operate to communicate bi-directionally with global network 1906 via communication channel 1916 and with server 1922 via a communication channel 1924. Server 1922 may operate to execute software instructions and store information.

Network region 1902 includes a multiplicity of clients with a sampling denoted as a client 1926 and a client 1928. Client 1926 includes a networking device 1934, a processor 1936, a GUI 1938 and an interface device 1940. Non-limiting examples of devices for GUI 1938 include monitors, televisions, cellular telephones, smartphones and PDAs (Personal Digital Assistants). Non-limiting examples of interface device 1940 include pointing device, mouse, trackball, scanner and printer. Networking device 1934 may communicate bi-directionally with global network 1906 via communication channel 1912 and with processor 1936 via a communication channel 1942. GUI 1938 may receive information from processor 1936 via a communication channel 1944 for presentation to a user for viewing. Interface device 1940 may operate to send control information to processor 1936 and to receive information from processor 1936 via a communication channel 1946. Network region 1904 includes a multiplicity of clients with a sampling denoted as a client 1930 and a client 1932. Client 1930 includes a networking device 1948, a processor 1950, a GUI 1952 and an interface device 1954. Non-limiting examples of devices for GUI 1938 include monitors, televisions, cellular telephones, smartphones and PDAs (Personal Digital Assistants). Non-limiting examples of interface device 1940 include pointing devices, mousse, trackballs, scanners and printers. Networking device 1948 may communicate bi-directionally with global network 1906 via communication channel 1914 and with processor 1950 via a communication channel 1956. GUI 1952 may receive information from processor 1950 via a communication channel 1958 for presentation to a user for viewing. Interface device 1954 may operate to send control information to processor 1950 and to receive information from processor 1950 via a communication channel 1960.

For example, consider the case where a user interfacing with client 1926 may want to execute a networked application. A user may enter the IP (Internet Protocol) address for the networked application using interface device 1940. The IP address information may be communicated to processor 1936 via communication channel 1946. Processor 1936 may then communicate the IP address information to networking device 1934 via communication channel 1942. Networking device 1934 may then communicate the IP address information to global network 1906 via communication channel 1912. Global network 1906 may then communicate the IP address information to networking device 1920 of server device 1908 via communication channel 1916. Networking device 1920 may then communicate the IP address information to server 1922 via communication channel 1924. Server 1922 may receive the IP address information and after processing the IP address information may communicate return information to networking device 1920 via communication channel 1924. Networking device 1920 may communicate the return information to global network 1906 via communication channel 1916. Global network 1906 may communicate the return information to networking device 1934 via communication channel 1912. Networking device 1934 may communicate the return information to processor 1936 via communication channel 1942. Processor 1936 may communicate the return information to GUI 1938 via communication channel 1944. User may then view the return information on GUI 1938.

Figure 20:
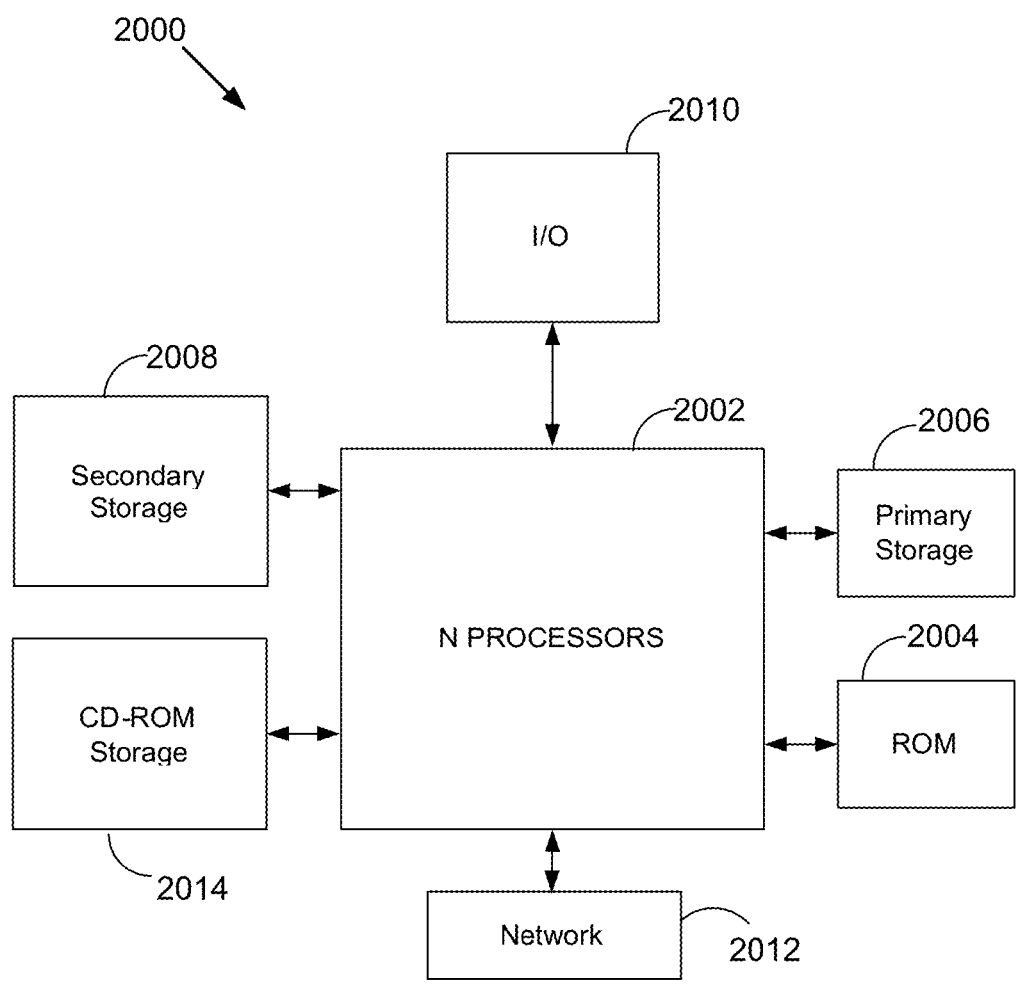
FIG. 20 illustrates a typical computer system that, when appropriately configured or designed, may serve as a computer system for which the present invention may be embodied.

FIG. 20 illustrates a typical computer system that, when appropriately configured or designed, may serve as a computer system 2000 for which the present invention may be embodied.

Computer system 2000 includes a quantity of processors 2002 (also referred to as central processing units, or CPUs) that may be coupled to storage devices including a primary storage 2006 (typically a random access memory, or RAM), a primary storage 2004 (typically a read-only memory, or ROM). CPU 2002 may be of various types including microcontrollers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors. As is well known in the art, primary storage 2004 acts to transfer data and instructions uni-directionally to the CPU and primary storage 2006 typically may be used to transfer data and instructions in a bi-directional manner. The primary storage devices discussed previously may include any suitable computer-readable media such as those described above. A mass storage device 2008 may also be coupled bi-directionally to CPU 2002 and provides additional data storage capacity and may include any of the computer-readable media described above. Mass storage device 2008 may be used to store programs, data and the like and typically may be used as a secondary storage medium such as a hard disk. It will be appreciated that the information retained within mass storage device 2008, may, in appropriate cases, be incorporated in standard fashion as part of primary storage 2006 as virtual memory. A specific mass storage device such as a CD-ROM 2014 may also pass data uni-directionally to the CPU.

CPU 2002 may also be coupled to an interface 2010 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 2002 optionally may be coupled to an external device such as a database or a computer or telecommunications or internet network using an external connection shown generally as a network 2012, which may be implemented as a hardwired or wireless communications link using suitable conventional technologies. With such a connection, the CPU might receive information from the network, or might output information to the network in the course of performing the method steps described in the teachings of the present invention.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC §112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC §112 (6). In some embodiments, the methods and/or system components which may be located and/or performed remotely include, without limitation: servers and global communication network.

It is noted that according to USA law, all claims must be set forth as a coherent, cooperating set of limitations that work in functional combination to achieve a useful result as a whole. Accordingly, for any claim having functional limitations interpreted under 35 USC §112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC §112 (6) is/(are) dependent on one or more remote servers located outside the USA, it is intended that each such recited function under 35 USC §112 (6) is to be interpreted as the function of the local system receiving the remotely generated information required by a locally implemented claim limitation, wherein the structures and or steps which enable, and breathe life into the expression of such functions claimed under 35 USC §112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC §112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of a secure communication system according to the present invention will be apparent to those skilled in the art. The invention has been described above by way of illustration, and the specific embodiments disclosed are not intended to limit the invention to the particular forms disclosed. For example, the particular implementation of the user interface may vary depending upon the particular type computing device used. The computing devices described in the foregoing were directed to laptop computing implementations; however, similar techniques using mobile computing implementations of the present invention are contemplated as within the scope of the present invention. The invention is thus to cover all modifications, equivalents, and alternatives falling within the spirit and scope of the following claims.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. A non-transitory computer-readable storage medium with an executable program stored thereon, wherein the program instructs a processor in a client machine to perform a method, the method comprising the steps of:

determining, on said client machine, an activation for secure access to a secured information stored on at least one server device, wherein said client machine and said at least one server device are communicating through a global communication network;

obtaining, on said client machine, at least a first username information, first password information, and first answer to a challenge question information configured to create a first account for at least one user for access to said secured information stored on said at least one server device, wherein said client machine communicates through said global communication network, said first username information to said at least one server device, and wherein said first username information is stored on said at least one server device;

constructing, on said client machine, a first password hash, in which a hash operation is performed on said first password information configured to construct said first password hash, wherein said client machine communicates through said global communication network, said first password hash to said at least one server device, and wherein said first password hash is stored on said at least one server device, and in which said first password hash is configured to authenticate a user account needing secure access to said secure information, and wherein said first password information is not communicated or stored on said at least one server device configured to ensure said first password information is not accessible to an administrator or a user associated with said at least one server device of said at least one server device;

generating, on said client machine, a first random key, in which said first random key comprising a first master key for encryption;

creating, on said client machine, a first encrypted master key, wherein said first master key is encrypted with said first password information to create said first encrypted master key, said client machine communicates through said global communication network, said first encrypted master key to said at least one server device, and wherein said first encrypted master key is stored on said at least one server device, and wherein said first master key is not accessible to said administrator or any other user associated with said at least one server device, in which an unencrypted form of said first encrypted master key is configured to retrieve or store encrypted content on said at least one server device;

producing, on said client machine, a first challenge answer hash, in which said first answer to said challenge question information is configured to produce said first challenge answer hash, wherein said client machine communicates through said global communication network, said first challenge answer hash to said at least one server device and said first challenge answer hash is stored on said at least one server device;

receiving, on said client machine, said first master key and said first answer to a challenge question information, in which said received first master key is encrypted with said answer to said first challenge question information being configured to generate a first encryption key;

formulating, on said client machine, a second encrypted master key, wherein said first encryption key is configured to formulate said second encrypted master key, in which said client machine communicates through said global communication network, said second encrypted master key to said at least one server device, and wherein said second encrypted master key is generally stored on said at least one server device;

prompting, on said client machine, at least a login username and a login password of a user requesting secure access to said secure information stored in said at least one server device, wherein said prompting step is a login process configured to authenticate a user logging into a created user account in said obtaining step, and wherein said login password is not communicated to said at least one server device to perform a secure login process, thereby, said login password is not accessible to said administrator or any other user associated with said at least one server device;

verifying, on said client machine, the authenticity of said login username and login password, in which a comparison password hash is generated with said login password, wherein said login username is compared with said first username information stored on said at least one server device, and said comparison password hash is compared against said stored first password hash, in which a matching comparison of said login username and said comparison password hash is configured to retrieve said first encrypted master key stored on said at least one server, and in which said first encrypted master key is decrypted with said login password to generate a master key identical to said first master key produced in said step of generating a random key for said content retrieval or storage; and communicating, by said client machine through said global communication network, a first encrypted content key and said encrypted content to said at least one server device for storage under said account created for said user, wherein only an account user logged in on said client machine has access to said content.

2. The method as recited in claim 1, further comprising the step of: retrieving said first encrypted master key stored on said at least one server, in which said first encrypted master key is decrypted with said login password to generate a master key identical to said first master key produced in said step of generating a random key for said content retrieval or storage, wherein said retrieving step is configured to ensure said user password can be reset with no loss of access to said content.

3. The method as recited in claim 2, further comprising the step of:

communicating, by said client machine through said global communication network, said login username and a challenge answer hash to said server in which said server validates the user by comparison of said communicated challenge answer hash and said stored first challenge answer hash for enabling access to at least said second encrypted master key, said encrypted content key, and encrypted content.

4. The method as recited in claim 1, further comprising the step of:

communicating, by said client machine through said global communication network, said login username and said comparison password hash to said at least one server device for retrieving said encrypted content in which said at least one server device validates the user by comparison of said communicated comparison password hash and said stored first password hash, wherein said encrypted content is not accessible to said administrator of said at least one server device or said any other user associated with said at least one server device.

5. The method as recited in claim 1, further comprising the steps of:

obtaining said message key from the user in which the user has shared said message key with at least one other user;

encrypting said content key using at least said message key to create a second encrypted content key; and communicating, by said client machine through said global communication network, said second encrypted content key to said server for storage in which the at least one other user accesses said encrypted content using said message key, wherein said step of obtaining a message key is configured to allow sharing of said content with at least one other user and prevent said administrator or any other user access to said content.

6. The method as recited in claim 5, in which said at least one other user uses said message key and content key in encrypting content to be shared with the user.

7. The method as recited in claim 1, in which said first hash function comprises a one-way hash algorithm.

8. The method as recited in claim 7, in which—a Password-Based Key Derivation Function 2 algorithm is used to generate an Advanced Encryption Standard key from said password to encrypt said master key.

9. The method as recited in claim 1, in which said master key comprises an Advanced Encryption Standard key that is greater than or equal to 128 bits.

10. The method as recited in claim 1, further comprising the steps of:
   obtaining a new username, new password and new answer to a challenge question from the user for changing account information of said first account for said at least one user;
   encrypting said login master key using said new password, said encrypted login master key being configured to create a new encrypted master key for said user;
   performing a third hash function on said new password, said hashed third function being configured to create a new password hash for said user;
   performing a fourth hash function on said new answer to create a new challenge answer hash for said user;
   encrypting said login master key using said new answer to create a new second encrypted master key for said user; and
   communicating, by said client machine through said global communication network, at least said new username, new password hash, new first encrypted master key, new challenge answer hash and said new second encrypted master key to said server for storage and user authentication.

11. A non-transitory computer-readable storage medium with an executable program stored thereon, wherein the program instructs a processor in a client machine to perform a method, the method comprising the steps of:
   obtaining, on said client machine, a username, answer to a challenge question and a new password from a user with an account;
   performing, on said client machine, a first hash function on said answer to challenge question for creating an answer to challenge question hash;
   communicating, by said client machine through a global communication network, said username and said answer to challenge question hash to a server for retrieving a second encrypted master key from said account of said user stored in said server, in which said server validates said user by comparison of said communicated answer to challenge question hash and a stored answer to said challenge question hash;
   receiving, on said client machine through said global communication network, said second encrypted master key from said server;
   decrypting said second encrypted master key using said answer to challenge question for generating a master key, said generated master key being an encryption key used for encrypting a content key, wherein said content key being an encryption key used for encrypting the user's content for storage on said server;
   encrypting said master key using said new password, said encrypted master key being configured to create a new first encrypted master key;
   performing a hash function on said new password being configured to create a new password hash; and
   communicating, by said client machine through said global communication network, at least said username, new password hash and new first encrypted master key to said server for storage and replacing a first password hash and a first encrypted master key in said user's account, in which said new first encrypted master key being secured from access from an administrator or any other users of said server, wherein said new password and said master key is not communicated to said server, whereby, said administrator or any other user associated with said server does not have access to said content stored on said server.

12. A system comprising:
   a server device, wherein said server device comprising;
   a communication portion, said communication portion is configured to receive, transmit or process information through a global communication network; and
   a processing and storage portion, said processing and storage portion is configured to receive, transmit, store, retrieve and process information;
   a client machine comprising:
   a user interface, said user interface is configured to obtain at least a first username information, a first password information, and a first answer to a challenge question information by said server device;
   a random key generator, said random key generator is configured for generating a first random key, said first random key comprising a master key for encryption, said random key generator is further configured for generating a second random key for use as a content key for encrypting selected content of a user;
   an encryption unit, said encryption unit is configured to encrypt said master key with a user supplied password, and wherein said encryption unit being further configured to create a first encrypted master key;
   a hash unit, said hash unit is configured to perform a hash function on said password to create a first password hash;
   an encryption unit, said encryption unit is configured to encrypt said content key using at least said master key to create a first encrypted content key;
   said encryption unit is further configured to encrypt a selected content using said content key to create encrypted content; and
   a communication unit, said communication unit is configured to communicate through said global communication network, at least said first username information, first password hash, first encrypted master key, first encrypted content key, and encrypted content to said server device for storage in an account of said user on said server device, said master key and first password information are not stored on said server device, whereby, an administrator or any other user associated with said server device does not have access to said encrypted content stored on said server device.

13. The system as recited in claim 12, further comprising:
   a hash unit performing a hash function on an answer to a challenge question to create a challenge answer hash;
   an encryption unit for encrypting said master key using said answer to create a second encrypted master key in which said challenge answer hash and said second encrypted master key are communicated to said server device through said global communication network, for storage in the user's account;
   an encryption unit for encrypting said content key using a message key from the user, in which the user has shared said message key with at least one other user, to create a second encrypted content key in which said second encrypted content key is communicated to said server device through said global communication network, for storage in which the at least one other user accesses said encrypted content using said message key.

14. The system as recited in claim 12 in which said hash function comprises a one-way hash algorithm to generate an Advanced Encryption Standard key from said password to encrypt said master key.

15. A non-transitory computer-readable storage medium with an executable program stored thereon, wherein the program instructs a processor in a client machine to perform the following steps:
   obtaining, on said client machine, a username and password from a user, wherein said username is transmitted and stored on at least one server device, and wherein said password is not transmitted or stored on said at least one server device, in which said client machine and said at least one server device are communicating through a global communication network;
   generating, on said client machine, a first random key for use as a master key for encryption, wherein said master key is not transmitted or stored in said at least one server device;
   encrypting, on said client machine, said master key using said password to create a first encrypted master key, wherein said client machine communicates through said global communication network, said first encrypted master key to said at least one server device and said first encrypted master key is stored on said at least one server device;
   performing, on said client machine, a first hash function on said password to create a password hash, wherein said client machine communicates through said global communication network, said password hash to said at least one server device and said password hash is stored on said at least one server device;
   generating, on said client machine, a second random key for use as a content key for encrypting selected content of the user;
   encrypting, on said client machine, said content key using at least said master key to create a first encrypted content key;
   encrypting, on said client machine, said selected content using said content key to create encrypted content; and
   communicating, by said client machine through said global communication network, said first encrypted content key, and encrypted content to said at least one server device for storage in an account created for the user on said at least one server device, wherein an administrator or any other user associated with said at least one server device does not have access to said selected content stored on said at least one server device.

16. The program instructing the processor as recited in claim 15, further comprising the steps of:
   obtaining an answer to a challenge question from the user;
   performing a second hash function on said answer to create a challenge answer hash;
   encrypting, on said client machine, said master key using said answer to create a second encrypted master key; and
   communicating, through said global communication network, said challenge answer hash and said second encrypted master key to said at least one server device for storage in the user's account.

17. The program instructing the processor as recited in claim 16, further comprising the step of:
   communicating, through said global communication network, said username and said challenge answer hash to said at least one server device in which said at least one server device validates the user by comparison of said communicated challenge answer hash and said stored challenge answer hash for enabling access to at least said second encrypted master key, said encrypted content key, and encrypted content.

18. The program instructing the processor as recited in claim 15, further comprising the steps of:
   communicating, through said global communication network, said username and said password hash to said at least one server device for retrieving said encrypted content in which said at least one server device validates the user by comparison of said communicated password hash and said stored password hash;
   receiving, through said global communication network, said encrypted master key, first encrypted content key, and encrypted content from said at least one server device; and decrypting said encrypted content using said content key.

19. The program instructing the processor as recited in claim 15, further comprising the steps of:
   obtaining a message key from the user in which the user has shared said message key with at least one other user;
   encrypting, on said client machine, said content key using at least said message key to create a second encrypted content key; and
   communicating, through said global communication network, said second encrypted content key to said at least one server device for storage in which the at least one other user accesses said encrypted content using said message key.

20. The program instructing the processor as recited in claim 19, in which said at least one other user uses said message key and content key in encrypting content to be shared with the user.

21. The program instructing the processor as recited in claim 15, in which said first hash function comprises a one-way hash algorithm.

22. The program instructing the processor as recited in claim 21, in which a Password-Based Key Derivation Function 2 algorithm is used to generate an Advanced Encryption Standard key from said password to encrypt said master key.

23. The program instructing the processor as recited in claim 15, in which said master key comprises an Advanced Encryption Standard key that is greater than or equal to 128 bits.

* * * * *